(12) United States Patent
Schwartz et al.

(10) Patent No.: US 8,333,112 B2
(45) Date of Patent: Dec. 18, 2012

(54) FREQUENCY TUNING OF DISC RESONATOR GYROSCOPES VIA RESONATOR MASS PERTURBATION BASED ON AN IDENTIFIED MODEL

(75) Inventors: David M. Schwartz, Los Angeles, CA (US); Dong-Joon Kim, Los Angeles, CA (US); Robert T. M'Closkey, Los Angeles, CA (US); A. Dorian Challoner, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 380 days.

(21) Appl. No.: 12/481,247

(22) Filed: Jun. 9, 2009

(65) Prior Publication Data

US 2009/0301193 A1    Dec. 10, 2009

Related U.S. Application Data

(60) Provisional application No. 61/060,400, filed on Jun. 10, 2008.

(51) Int. Cl.
*G01P 9/04* (2006.01)
(52) U.S. Cl. .................................. 73/504.13; 73/504.12
(58) Field of Classification Search ................ 73/504.02, 73/604.04, 504.12, 504.14, 504.13, 1.77; 702/75, 94
See application file for complete search history.

(56) References Cited

U.S. PATENT DOCUMENTS

| 7,068,126 B2 * | 6/2006 | Huang et al. ................. 333/186 |
| 7,102,467 B2 * | 9/2006 | Lutz et al. ..................... 333/186 |
| 7,168,318 B2 * | 1/2007 | Challoner et al. ......... 73/504.13 |
| 7,649,304 B2 * | 1/2010 | Umeda et al. ................. 310/320 |
| 7,779,530 B2 * | 8/2010 | Kawashima .................... 29/594 |
| 2006/0006964 A1 | 1/2006 | Huang et al. |

FOREIGN PATENT DOCUMENTS

| EP | 1 804 022 A1 | 7/2007 |
| JP | 2007312157 | 11/2007 |

OTHER PUBLICATIONS

Abdelmoneum et al., "Location-Dependent Frequency Tuning . . .," 0-7803-8414-8, 2004 IEEE International Ultra.Ferro.&Freq.Cont. Joint 50th Anniv. Conf., 2004.

(Continued)

*Primary Examiner* — Helen C. Kwok
(74) *Attorney, Agent, or Firm* — Canady & Lortz LLP; Bradley K. Lortz

(57) ABSTRACT

Techniques for reducing the frequency split between the Coriolis-coupled modes in disc resonator gyroscopes (DRGs) by perturbing the mass distribution on the disc resonator based on an identified model are disclosed. A model-identification method of tuning a resonator comprises perturbing the mass and measuring a frequency response matrix of the resonator. The frequency response matrix includes a plurality of inputs and a plurality of outputs and the resonator has a plurality of coupled resonance modes. A reduced structural mechanics matrix model of the resonator in sensor and actuator coordinates is identified from the measured frequency response matrix and analyzed to determine generalized eigenvectors of the structural mechanics model and their variations due to selected mass perturbations which is then estimated to improve degeneracy of the plurality of coupled resonance modes based on the generalized eigenvectors of the mass and the stiffness.

23 Claims, 19 Drawing Sheets

OTHER PUBLICATIONS

Adams et al., "Independent Tuning of Linear and Nonlinear Stiffness Coefficients," 1057-7157, J. of MEMS, vol. 7, No. 2, Jun. 1998.

Ayazi et al., "A HARPSS Polysilicon Vibrating Ring Resonator," 1057-7157, J. of MEMS, vol. 10, No. 2, Jun. 2001.

Kim et al., "A Systematic Method for Tuning the Dynamics of Electrostatically Actuated Vibratory Gyros," 1063-6536, IEEE Trans. on Control Sys. Tech., vol. 14, No. 1, Jan. 2006.

Lynch, "Part X: Hemispherical Resonator Gyro," IEEE Trans. on Aerospace and Electr. Systems, vol. AES-20, No. 4, pp. 432-433, Jul. 1984.

Combined Search and Examination Report for GB0910027.2, Oct. 15, 2009.

* cited by examiner

FREQUENCY TUNING OF DISC RESONATOR GYROSCOPES VIA RESONATOR MASS PERTURBATION BASED ON AN IDENTIFIED MODEL

CROSS-REFERENCE TO RELATED APPLICATIONS

This application claims the benefit under 35 U.S.C. §119 (e) of the following U.S. Provisional Patent Application, which is incorporated by reference herein:

U.S. Provisional Application Ser. No. 61/060,400, filed Jun. 10, 2008, by Schwartz et al., entitled "FREQUENCY TUNING OF DISC RESONATOR GYRO VIA MASS MATRIX PERTURBATION".

This application is related to the following co-pending applications, which are all incorporated by reference herein:

U.S. patent application Ser. No. 12/473,084, filed May 27, 2009, and entitled "ISOLATED ACTIVE TEMPERATURE REGULATOR FOR VACUUM PACKAGING OF A DISC RESONATOR GYROSCOPE", by Ge et al.;

U.S. patent application Ser. No. 12/416,911, filed Apr. 1, 2009, and entitled "ENVIRONMENTALLY ROBUST DISC RESONATOR GYROSCOPE", by Ge et al.;

U.S. patent application Ser. No. 12/416,894, filed Apr. 1, 2009, and entitled "THERMAL MECHANICAL ISOLATOR FOR VACUUM PACKAGING OF A DISC RESONATOR GYROSCOPE", by Ge et al.;

U.S. patent application Ser. No. 11/458,911 (Application Publication No. US 2007 0017287 A1), filed Jul. 20, 2006, and entitled "DISC RESONATOR GYROSCOPES", by Kubena et al.;

U.S. patent application Ser. No. 11/757,395 (Application Publication No. 2008-0295622A1), filed Jun. 4, 2007, and entitled "PLANAR RESONATOR GYROSCOPE WITH CENTRAL DIE ATTACHMENT", by Challoner; and U.S. patent application Ser. No. 11/831,822, filed Jul. 31, 2007, and entitled "DISC RESONATOR INTEGRAL INERTIAL MEASUREMENT UNIT", by Challoner et al.

STATEMENT OF GOVERNMENT RIGHTS

This invention was made with Government support under NSF Grant #0601622 awarded by the National Science Foundation. The Government has certain rights in this invention.

BACKGROUND OF THE INVENTION

1. Field of the Invention

This invention relates to tuning of resonator gyroscopes. Particularly, this invention relates to tuning of microelectromechanical system (MEMS) disc resonator gyroscopes.

2. Description of the Related Art

Most high-performance vibratory angular rate sensors rely on the matching of the frequencies of two modes that are highly coupled by a Coriolis acceleration term when the equations of motion are written in a case-fixed coordinate system. Frequency matching exploits the mechanical gain afforded by the sensor dynamics and leads to the best attainable signal-to-electronic noise ratio. The degenerate dynamics can be attained by designing structures with a high degree of symmetry and in the case of the Boeing Silicon disc resonator gyro (SiDRG), this symmetric design also provides a high degree of isolation of the Coriolis modes from linear acceleration of the sensor case. These ideas have also been exploited in Litton's hemispherical resonator gyro (HRG), the BAE nickel ring gyro, and the BEI quartz tuning fork gyro. In all of these sensors, the anchor attaching the resonant structure to the sensor case is, ideally, a nodal point for the Coriolis coupled modes and the symmetric design, on its face, guarantees degenerate modal frequencies. Furthermore, the high degree of isolation reduces energy dissipation in the modes, which is a source of angular rate bias and drift. The HRG is an extreme example of the degree of isolation that can be achieved; quality factors exceeding $6 \times 10^6$ have been reported when the resonators are fabricated from fused quartz. See, e.g. Loper et al., "The HRG. A new low-noise inertial rotation sensor," 16th Joint Services Data Exchange for Inertial Systems, Los Angeles, Calif. November 1981; Lynch, "Hemispherical Resonator Gyro," In Ragan. R. R. (ed.) "Inertial technology for the future," IEEE Trans on Aerospace and Electronic Systems, AES-20, 4. pp. 414-444, 1984; which are both incorporated by reference herein.

FIG. 1 illustrates typical modal frequency splitting in a disc resonator gyroscope. The SiDRG frequency response is shown with a narrow, 100 Hz band encompassing the "fundamental" Coriolis modes. Though the frequency split is small in a relative sense (e.g. less than 0.3%), the sensor effectively has no mechanical gain in this state. For those sensors lending themselves to MEMS fabrication, such as the SiDRG, local variations in etch rate produce very small, but somewhat unpredictable, asymmetries that manifest themselves as such splitting of the modal frequencies. Although the frequency splits are small (e.g. on the order of 0.3% or less), the absolute separation between the modal frequencies coupled with their relatively high Q conspire to eliminate the mechanical gain advantage that was a primary objective of sensor's design in the first place.

In past work, the resonant frequencies of the SiDRG have been tuned by locally altering the resonator stiffness by applying electrostatic forces with dedicated electrodes See, e.g. Adam et al., "Independent Tuning of Linear and Nonlinear Stiffness Coefficients," IEEE J. Microelectroomechanical Systems, Vol 7. No. 2. pp. 172-180, 1998; Ayazi et al., "A HARPS Polysilicon Vibrating Ring Gyroscope," IEEE J Microelectromechanical Systems. Vol. 10, No. 2, pp. 169-179, 2001; and Kim et al. "A systematic method for tuning the dynamics of electrostatically actuated vibratory gyros," IEEE Trans. Control System Technology, Vol. 14, No. 1, pp 69-81, 2006; which are all incorporated by reference herein. Unfortunately the electrodes are required to hold a very stable voltage over the operating environment, which can be difficult to do with compact, low-cost electronics. The possibility of tuning the modes by permanently altering the mass distribution of the sensor is attractive because it eliminates the need for tuning bias voltages. See, e.g., Ahddmoneum et al., "Location-Dependent Frequency Tuning of Vibrating Micromechanical Resonators Via Laser Trimming" 2004 IEEE lnt. Ultrasonics, Ferroelectrics, and Frequency Control. Symp., pp 272-279, 2004; which is incorporated by reference herein.

In view of the foregoing, there is a need in the art for techniques for efficiently tuning resonator gyroscopes. In addition, there is a need for such techniques to enhance overall performance of such gyroscopes at a reduced cost. There is further a need for such techniques for resonator gyroscopes in space applications. These and other needs are met by the teaching of the present disclosure as detailed hereafter.

SUMMARY OF THE INVENTION

This disclosure presents techniques for tuning the resonant modes in MEMS vibratory gyroscopes using mass perturbation of the sensor's resonant structure. The approach ameliorates the stringent bias voltage stability requirements and can be applied to any resonator gyroscope that relies on modal frequency matching for optimum performance. Techniques for reducing the frequency split between the Coriolis-coupled modes in disc resonator gyroscopes (DRGs) by perturbing the mass distribution on the disc resonator based on an identified model are disclosed. A model-identification method of tuning a resonator comprises perturbing the mass and measuring a frequency response matrix of the resonator. The frequency response matrix includes a plurality of inputs and a plurality of outputs and the resonator has a plurality of coupled resonance modes. A reduced structural mechanics matrix model of the resonator in sensor and actuator coordinates is identified from the measured frequency response matrix and analyzed to determine generalized eigenvectors of the structural mechanics model and their variations due to selected mass perturbations which is then estimated to improve degeneracy of the plurality of coupled resonance modes based on the generalized eigenvectors of the mass and the stiffness.

A typical method of tuning a resonator comprises measuring a frequency response matrix of the resonator, the frequency response matrix having a plurality of inputs and a plurality of outputs and the resonator having a plurality of coupled resonance modes, fitting a structural mechanics model of the resonator to the frequency response matrix to identify parameters of the structural mechanics model including mass, damping, and stiffness matrices and their sensitivity to mass perturbation, and estimating an amount of the mass perturbation to the resonator to improve degeneracy of the plurality of coupled resonance modes based on the identified mass and the stiffness matrices and the determined sensitivity to the mass perturbation. The mass perturbation may comprise removing mass by a laser ablation process and/or adding mass by a mass deposition process. Typically, the parameters of the structural mechanics model further include an R matrix reflecting signal conditioning and non-colocation in operating the resonator.

In some embodiments, estimating the mass perturbation to the resonator comprises estimating a location of axes of antinodes and frequency split of the coupled resonance modes based on the parameters of the mass and the stiffness matrices. The tuning method may also include creating the amount of the mass perturbation on the resonator along one of the axes of the antinodes of the coupled resonance modes after determining that adequate degeneracy of the frequency split of the coupled resonance modes has not been reached. In this case, the antinodes of the coupled resonance modes may comprise high frequency antinodes and low frequency antinodes and creating the estimated amount of the mass perturbation may comprise adding mass on the resonator along the axes of the high frequency antinodes of the coupled resonance modes. Alternately, the antinodes of the coupled resonance modes may comprise high frequency antinodes and low frequency antinodes and creating the estimated amount of the mass perturbation may comprise removing mass on the resonator along the axes of the low frequency antinodes of the coupled resonance modes.

Further, in some embodiments the resonator may be a disc resonator comprising a plurality of concentric interconnected rings. Typically, the plurality of coupled resonance modes may be Coriolis coupled modes of the disc resonator. Further, interconnections between the rings may be aligned to form spokes and the estimated amount of the mass perturbation may be estimated on two of the spokes closest one of axes of antinodes of the coupled resonance modes of the disc resonator. In this case, the estimated amount of the mass perturbation may be created on a first and then a second of the two spokes closest the one of the axes of the antinodes of the coupled resonance modes of the disc resonator and re-measuring the frequency response matrix of the resonator after creating the estimated amount of the mass perturbation to each of the first and the second of the two spokes. The antinodes of the coupled resonance modes may comprise high frequency antinodes and low frequency antinodes and creating the amount of the mass perturbation may comprise adding mass to the first and then the second of the two spokes closest the axes of the high frequency antinodes of the disc resonator. Alternately, the antinodes of the coupled resonance modes may comprise high frequency antinodes and low frequency antinodes and creating the amount of the mass perturbation may comprise removing mass to the first and then the second of the two spokes closest the axes of the low frequency antinodes of the disc resonator. Data of the measured and re-measured frequency response matrix may be used to fit the structural mechanics model of the resonator to redetermine parameters of the structural mechanics model including the mass, the damping, and the stiffness matrices, and further including a mass change at each of the two spokes. Estimating the amount of the mass perturbation to the disc resonator to improve degeneracy of the plurality of coupled resonance modes may comprise solving for the mass change at each of the two spokes to improve degeneracy based on the redetermined parameters of the structural mechanics model.

In a similar manner, a typical method of tuning a disc resonator, comprises measuring a frequency response matrix of the disc resonator, the frequency response matrix having a plurality of inputs and a plurality of outputs and the disc resonator having a plurality of coupled Coriolis resonance modes having axes of antinodes, fitting a structural mechanics model of the disc resonator to the frequency response matrix to identify parameters of the structural mechanics model including mass, damping, and stiffness matrices and their sensitivity to mass perturbation, and estimating an amount of the mass perturbation to the disc resonator at the axes of the antinodes to improve degeneracy of the plurality of coupled Coriolis resonance modes based on the parameters of the mass and the stiffness matrices. The disc resonator may comprise a plurality of concentric interconnected rings. The mass perturbation may be created on the disc resonator along one of the axes of the antinodes of the coupled Coriolis resonance modes after determining that adequate degeneracy of the frequency split of the coupled Coriolis resonance modes has not been reached. The antinodes of the coupled Coriolis resonance modes may comprise high frequency antinodes and low frequency antinodes and creating the mass perturbation comprises adding mass on the disc resonator along the axes of the high frequency antinodes of the coupled Coriolis resonance modes. Alternately, the antinodes of the coupled Coriolis resonance modes may comprise high frequency antinodes and low frequency antinodes and creating the mass perturbation may comprise removing mass on the disc resonator along the axes of the low frequency antinodes of the coupled Coriolis resonance modes. This method may be further modified consistent with other method embodiments described herein.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

As previously mentioned, electrostatic tuning of the resonant modes in vibratory gyroscopes is often suggested as a means for compensating for manufacturing aberrations that produce detuned resonances. In high performance sensors, however, this approach can place very stringent requirements on the stability of the bias voltages used for such tuning. Furthermore, the bias voltage stability must be maintained over the operating environment, especially with regard to temperature variations.

This disclosure presents techniques for tuning the resonant modes in MEMS vibratory gyroscopes using mass perturbation of the sensor's resonant structure. The approach ameliorates the stringent bias voltage stability requirements and can be applied to any resonator gyroscope that relies on modal frequency matching for optimum performance.

Figure 1:
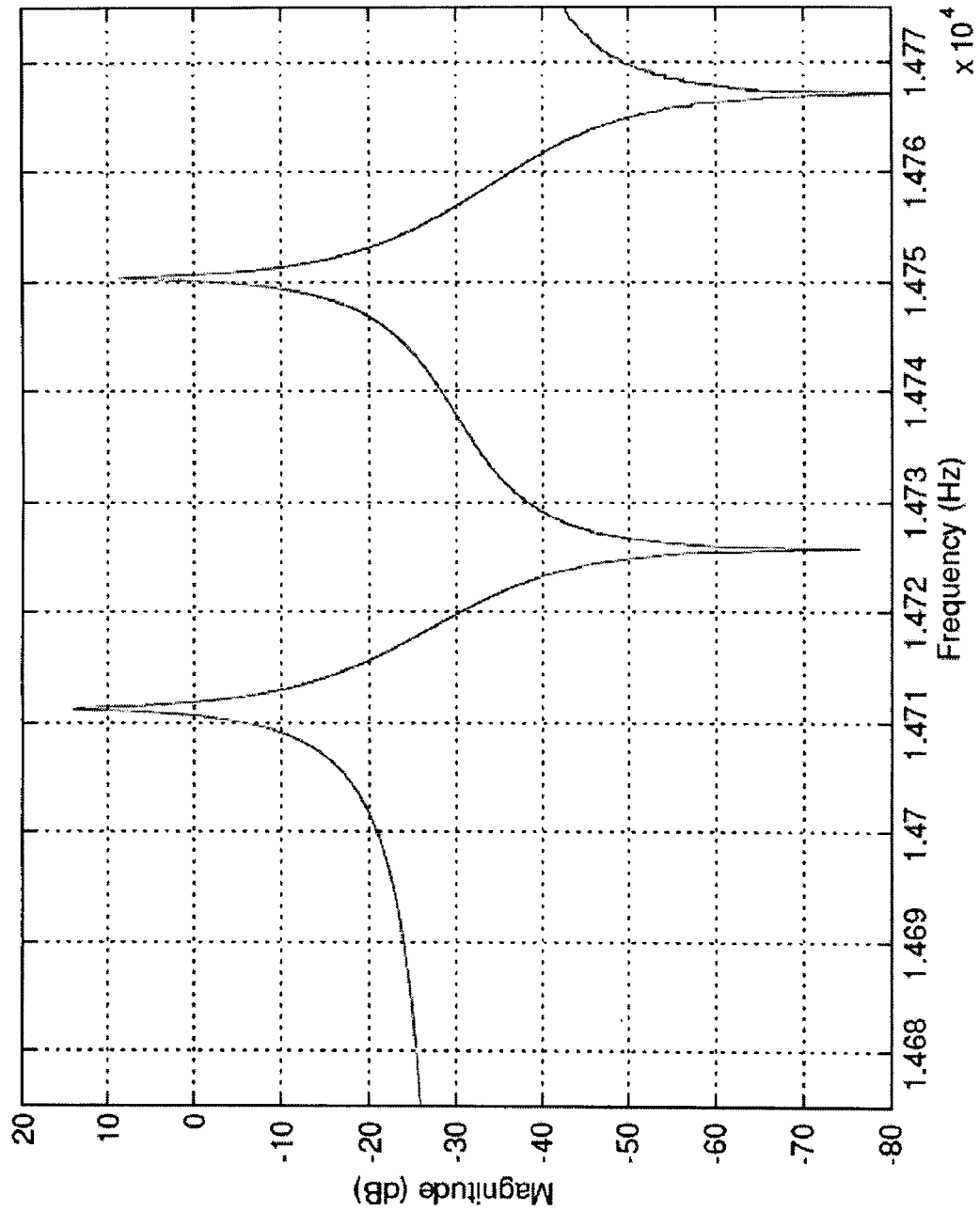
FIG. 1 illustrates typical modal frequency splitting in a disc resonator gyroscope.

Tuning modes of a disc resonator gyroscope (e.g., the SiDRG) can be accomplished by using a laser to strategically trim the resonator. In order to develop appropriate mass perturbation algorithms a scale model of the a disc resonator, which may be called the Macro DRG, can be fabricated. Using a novel model identification method, the effects of mass matrix perturbation on the Macro DRG can be studied and several frequency tuning approaches demonstrated as described hereafter. The present disclosure teaches a systematic technique for tuning modal frequencies of a DRG (e.g. as shown in FIG. 1) to degeneracy by perturbing the resonator mass matrix. In practical applications, the mass perturbations may be achieved by removing resonator mass with, for example, a laser ablation tool (e.g. resonetics.com), or by adding mass to the resonator with, for example, ink-jet printing technology (e.g. microfab.com).

2. Macro Disc Resonator Gyroscope (DRG)

An exemplary SiDRG possesses the advantages of the HRG at a much lower cost. The known SiDRG may be described as a thin concentric interconnected multi-ring structure with an approximately 8 mm diameter. Typically, at least some of the interconnections between the concentric rings are aligned to form radial "spokes" extending from the center of the disc. In operation, sensing, driving and trimming electrodes are embedded within the gaps between the interconnected rings. It should be noted that the Macro DRG employs a set of external electromagnetic actuators and pick-off sensors to measure the frequency response matrix as described hereafter. However, in a practical application measuring the frequency response matrix of the resonator may typically be achieved through operation of the electrodes embedded in the gaps of the DRG as will be understood by those skilled in the art.

Figure 2:
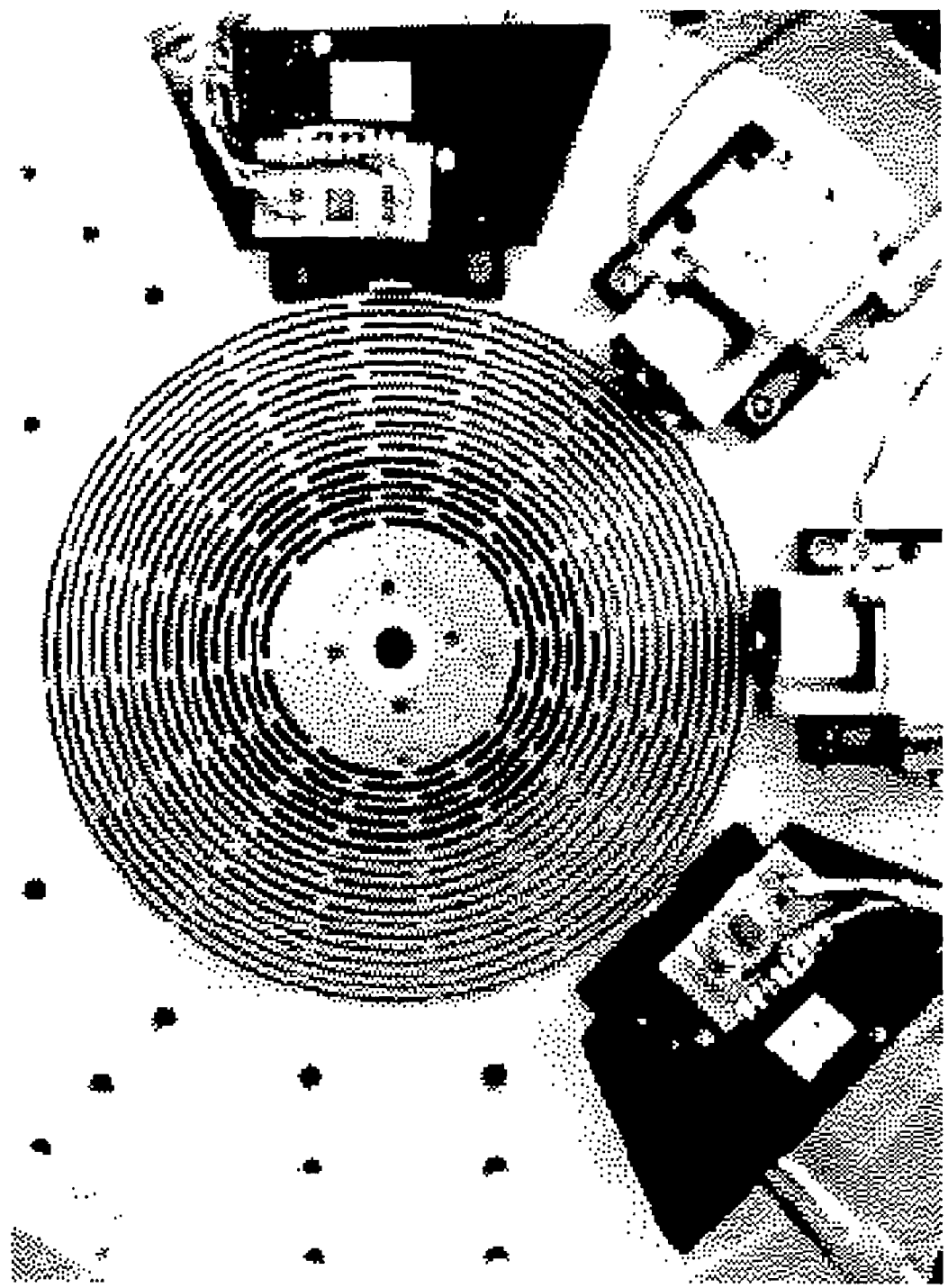
FIG. 2 illustrates an exemplary Macro DRG which models the SiDRG as an example DRG.

FIG. 2 illustrates an exemplary Macro DRG which models the SiDRG, as an example DRG to be tuned. The Macro DRG is a steel simulacrum of the SiDRG with an outer diameter of approximately 12 cm. The Macro DRG is instrumented with two electromagnetic actuators, labeled D1 and D2, and two capacitive pick-offs that detect planar deflection of the resonator located at S1 and S2, mounted on linear translation stages for a precise gap control.

Figure 3:
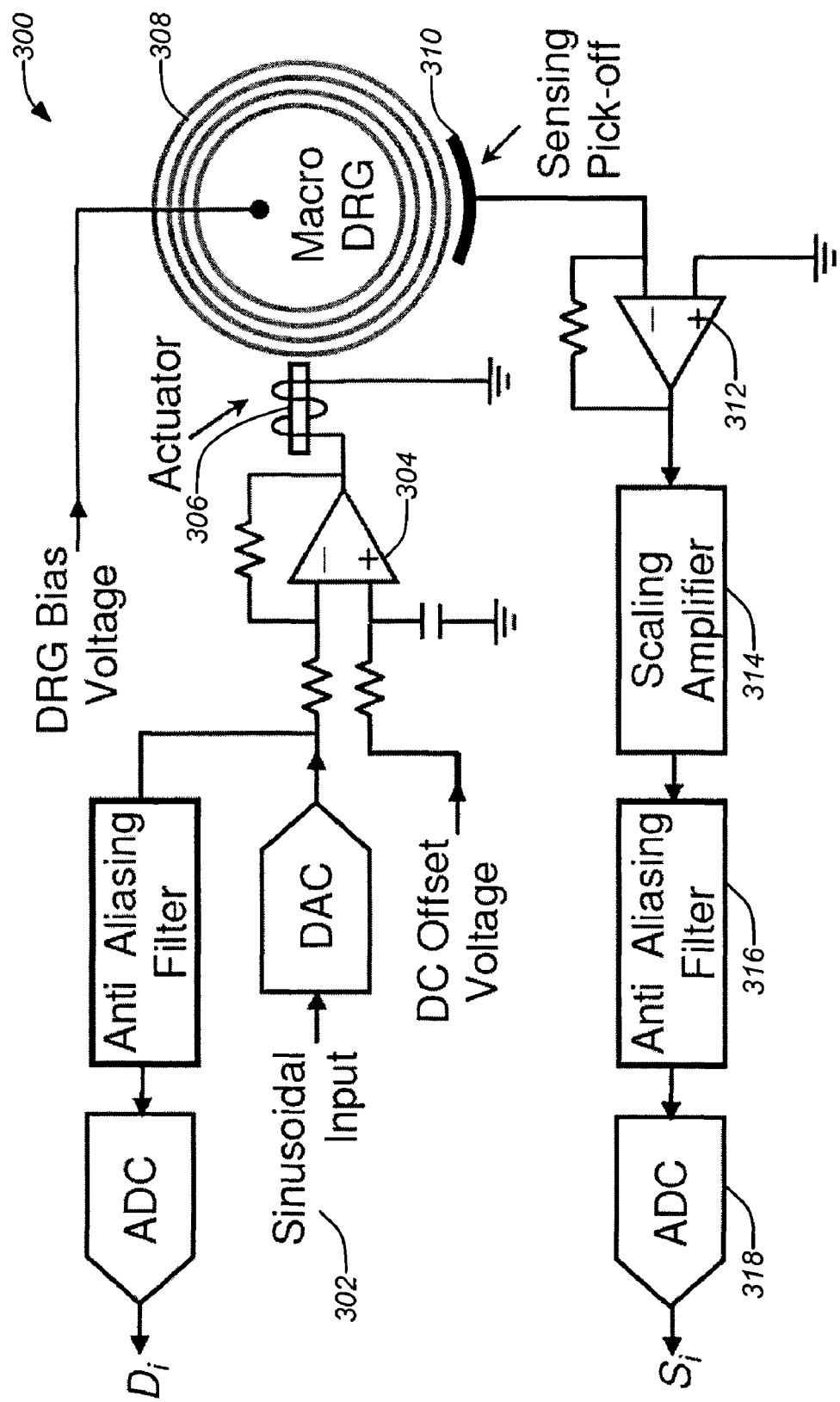
FIG. 3 shows the block diagram of a testing setup for an exemplary open loop system identification.

FIG. 3 shows the block diagram of a testing setup 300 for an exemplary open loop system identification. Filtered drive and sense signals are denoted $D_i$ and $S_i$, $i=1,2$. Frequency response data may be used to construct a two-input/two-output model of the sensor. A digital signal processor (DSP) may be used to generate the sinusoidal input signals 302 that drive an op-amp 304 whose output energizes the electromagnetic actuators 306 thereby applying radial forces to the resonator 308 (i.e. the Macro DRG). The structural response of the Macro DRG 308 creates a varying capacitance that produces a current in the sensing pick-off 310 which is then converted into buffered voltage via a transimpedance amplifier 312. The sense signals may be further amplified & scaled 314 and filtered 316 prior to sampling 318. Small NdFeB magnets (e.g. disc shape, 1.5 mm diameter, 0.75 mm thickness) may be placed on the top surface of the resonator to function as (reversible) mass perturbations.

Figure 4:
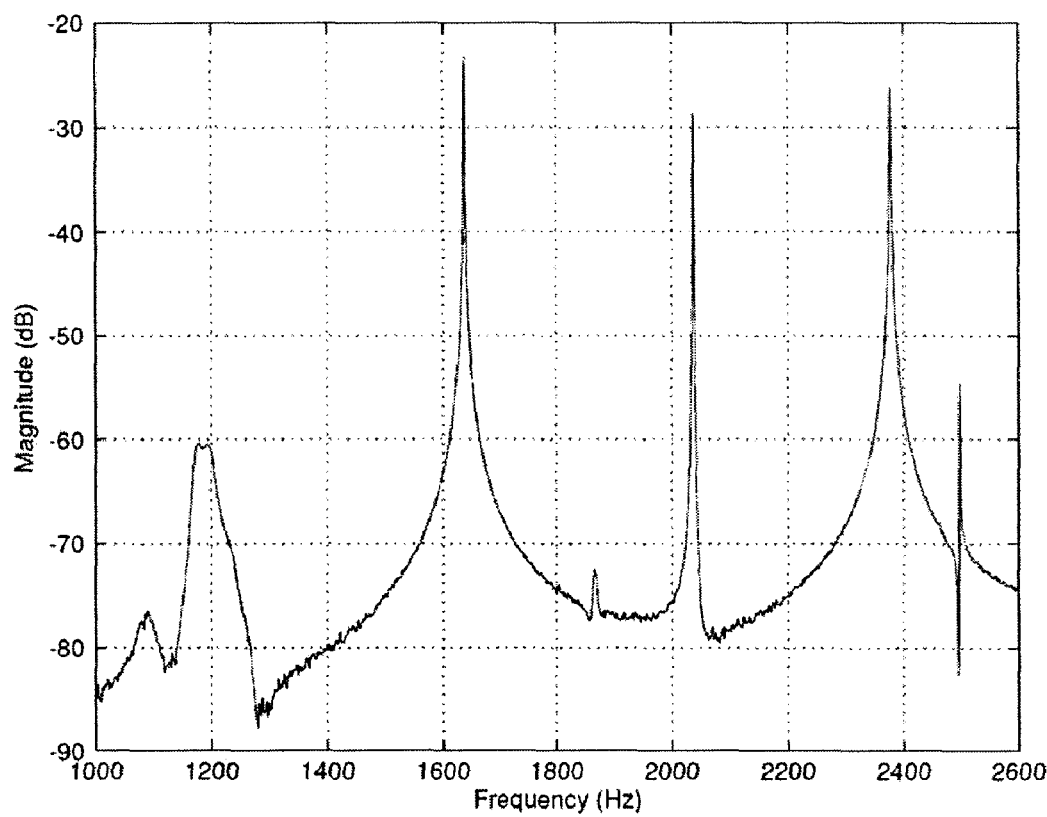
FIG. 4 shows a single channel of example Macro DRG frequency response data.
Figure 4:
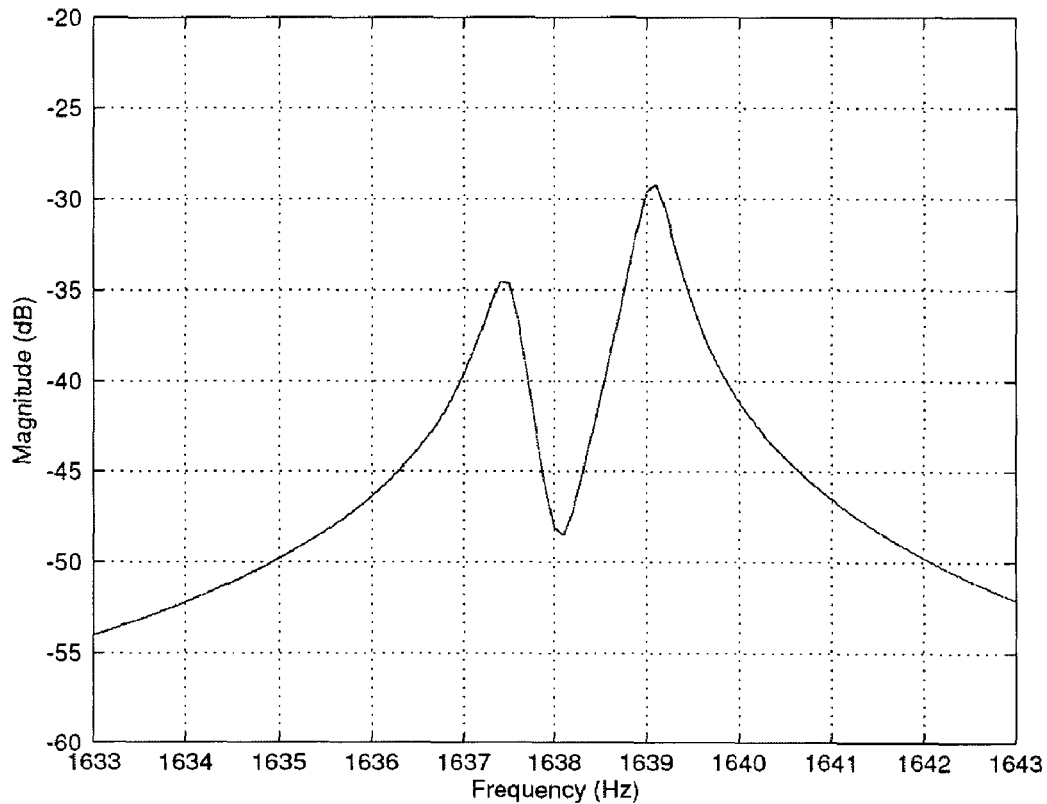

FIG. 4 shows a single channel of example Macro DRG frequency response data. The S1/D1 channel empirical frequency response of the Macro DRG showing widehand data in the top plot and narrowband dynamics data in a neighborhood of the Coriolis-coupled modes in the bottom plot. Just as in the actual SiDRG response, the Coriolis-coupled modes of the Macro DRG have a small but detrimental frequency split despite the fact that the steel resonator visually exhibits symmetry. Small magnets are attached to the interconnected rings of the resonator to achieve mass loading, thereby altering the mass matrix governing the modal coupling. The fundamental Coriolis modes are near 1.6 kHz and the zoomed frequency response shows the individual Coriolis-coupled modes exhibiting a 2 Hz (0.12%,) frequency split.

3. Disc Resonator Gyroscope Sensor Model

The system identification method used to guide the mass perturbation process is based on the one developed for electrostatic tuning of the gyro dynamics. See, e.g. Ayazi et al., "A HARPS Polysilicon Vibrating Ring Gyroscope," IEEE J Microelectromechanical Systems. Vol. 10, No. 2, pp. 169-179, 2001, which is incorporated by reference herein. The known electrostatic tuning case is briefly reviewed here in order to highlight the differences with the sensor model used in the mass perturbation analysis. For electrostatic tuning, the linear mechanics of nearly degenerate vibratory gyros in a neighborhood of the Coriolis-coupled modes can be modeled as follows.

$$H_{out}(s)RZ_{act}^{-1}(s), \quad (1)$$

where s is the Laplace transform variable and where $$Z_{act}(s) := Ms^2 + Cs + K_0 + \sum_{p=1}^{n_e} K_p v_p^2. \quad (2)$$

In this model M, C, and $K_0$ are real 2×2 positive definite mass, damping and stiffness matrices, respectively. There are $n_e$ electrodes on the sensor that are dedicated for electrostatically tuning the modes and the "stiffness matrix sensitivity" associated with these electrodes are given by the real symmetric matrices $K_p$, p=1, . . . ; $n_e$, which are multiplied by the square of the voltage potentials existing between the electrodes and resonator (denoted $v_p$, p=1, . . . , $n_e$). The angular rotation rate of the sensor is assumed to be zero in this model. The subscript on $Z_{act}$, denotes that the system matrices are written in the generalized coordinates specified by the actuator (forcer) frame. The transfer function $H_{out}$ represents any dynamics associated with the signal conditioning electronics and R∈$R^{2\times 2}$ captures the effects of non-co-located pick-offs and forcers.

The model parameters $\{M, C, K_0, K_1, \ldots, K_{n_e}\}$ are estimated by using frequency response data from $n_{exp}$ experiments conducted at different tuning electrode voltage potentials. In other words, the k-th experiment (where k=1, ... $n_{exp}$) with tuning potentials defined by $\{v_{k,1}, v_{k,1}, \ldots, v_{k,n_e}\}$, yields two-input/two-output complex-valued frequency response data $\{\Psi_{k,1}, \Psi_{k,2}, \ldots, \Psi_{k,n_k}\}$ corresponding to the $m_k$ frequencies $\{\omega_{k,1}, \omega_{k,2}, \ldots, \omega_{k,m_k}\}$ The minimax optimization problem for estimating the sensor parameters is $$\begin{aligned}
&\min && \max \\
&M > I, C > 0 && k = 1, \ldots, n_{exp} \quad \bar{\sigma}(\tilde{R}_{k,q} - \psi_{k,q} Z_{act}(j\omega_{k,q})), \\
&K_p \leq 0, p = 1, \ldots, n_e && q = 1 \ldots, m_k \\
&K_0 + \sum K_p v_p^2 > 0 \\
&R_l \in C^{2\times 2}, l = 0, 1, \ldots, n_R
\end{aligned} \quad (3)$$

where $$\tilde{R}_{k,q} := \sum_{l=0}^{n_R} R_l \omega_{k,q}^l, \quad (4)$$

and where evaluating $Z_{act}$ at the qth frequency point associated with the kth experiment yields $$Z_{act}(j\omega_{k,q}) := -M\omega_{k,q}^2 + K_0 + \sum_{p=1}^{n_e} K_p v_{k,p}^2 + jC\omega_{k,q}. \quad (5)$$

The M>I constraint in equation (3) is imposed rather than the typical M>0 because in the latter case all of the free parameters may scaled by a nonzero constant so as to make the cost arbitrarily small without actually changing the model frequency response. Also note that $H_{out}R$ has been replaced by $\tilde{R}$. This recognizes the fact that any additional dynamics due to, for example, signal conditioning preamplifiers, should not exhibit significant magnitude and phase changes in a neighborhood of the resonant modes. If these dynamics can be reflected to the sensor output then they can be combined with R into a low order polynomial function of frequency with coefficients in $C^{2\times 2}$, i.e. $\tilde{R}$ is degree $n_R$. In fact, $\tilde{R}$ can be viewed as combining the first few terms of the Taylor series expansion of the frequency response function of $H_{out}$ with sensor-actuator combined with non-collocation effects. Once the model parameters are identified, it is possible to compute the bias potentials necessary to tune the modes to degeneracy, i.e. the potentials are selected so that the generalized eigenvalues of the pair $$\left(M, K_0 + \sum_{p=1}^{n_e} K_p v_p^2\right)$$

are equal.

The present analysis requires modification of $Z_{act}$. Assume that $n_{exp}$ experiments are conducted in which mass is added to, or removed from, the resonator. The kth experiment generates frequency response data $\{\Psi_{k,1}, \Psi_{k,2}, \ldots, \Psi_{k,m_k}\}$ at the following grid of frequencies $\{\omega_{k,1}, \omega_{k,2}, \ldots, \omega_{k,m_k}\}$. The index k=0 is reserved for the unperturbed case. In this scenario, $Z_{act}$ in equation (3) is replaced by $$Z_{act}(j\omega_{k,q}) := -M\omega_{k,q}^2 + K_0 + \sum_{p=1}^{n_e} K_p v_{k,p}^2 + jC\omega_{k,q} \quad (6)$$

where $\omega_{k,q}$ is the qth frequency point affiliated with the kth experiment. As mentioned above, $M_0$ represents the mass matrix of the unperturbed sensor, and $M_1$, $M_2$, etc., represent the mass matrices corresponding to perturbed sensor states.

No mathematical distinction need be made between mass removal and mass addition scenarios. As in the electrostatic tuning case, a minimax problem can be specified to compute the model parameters in this mass perturbation scenario, $$\min_{\substack{K>0, C>0 \\ M_k>1, k=1,\ldots,n_{exp} \\ R_l \in C^{2\times 2}, l=0,1,\ldots,n_R}} \max_{q=1,\ldots,m_k} \bar{\sigma}(\tilde{R}_{k,q} - \psi_{k,q} Z_{act}(j\omega_{k,q})), \quad (7)$$

where $\tilde{R}_{k,q}$ is given by equation (4) and $\bar{\sigma}$ is the maximum singular value. The approach forces the differences between the frequency response data among the experiments to be captured by the changes in the sensor mass matrix. Note that equation (7) can also be formulated as a convex optimization.

4. Exemplary Application of DRG Model

Experimental data is generated by driving each actuator with a narrow band chirp sequence that encompasses the Coriolis modes of the Macro DRG. The input-output sequences may be processed to yield 2×2 empirical frequency response data on a grid of frequencies with 0.1 Hz resolution. The model of equation (6) can now be applied to two mass perturbation cases, in addition to the nominal case when no mass perturbation is present.

Figure 5:
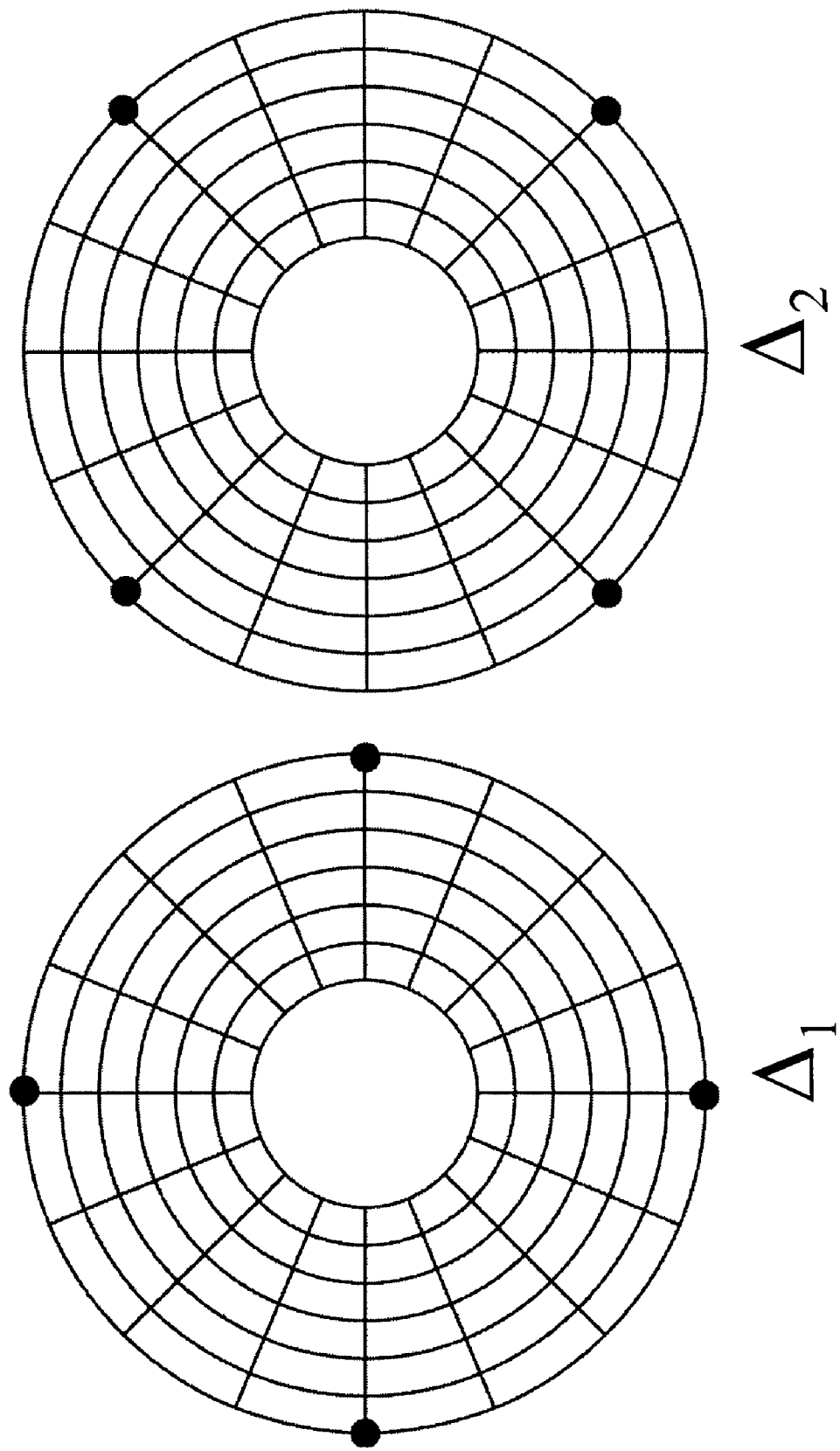
FIG. 5 shows two example mass perturbation cases placing four magnets on the outer ring of the Macro DRG.
Figure 6A:
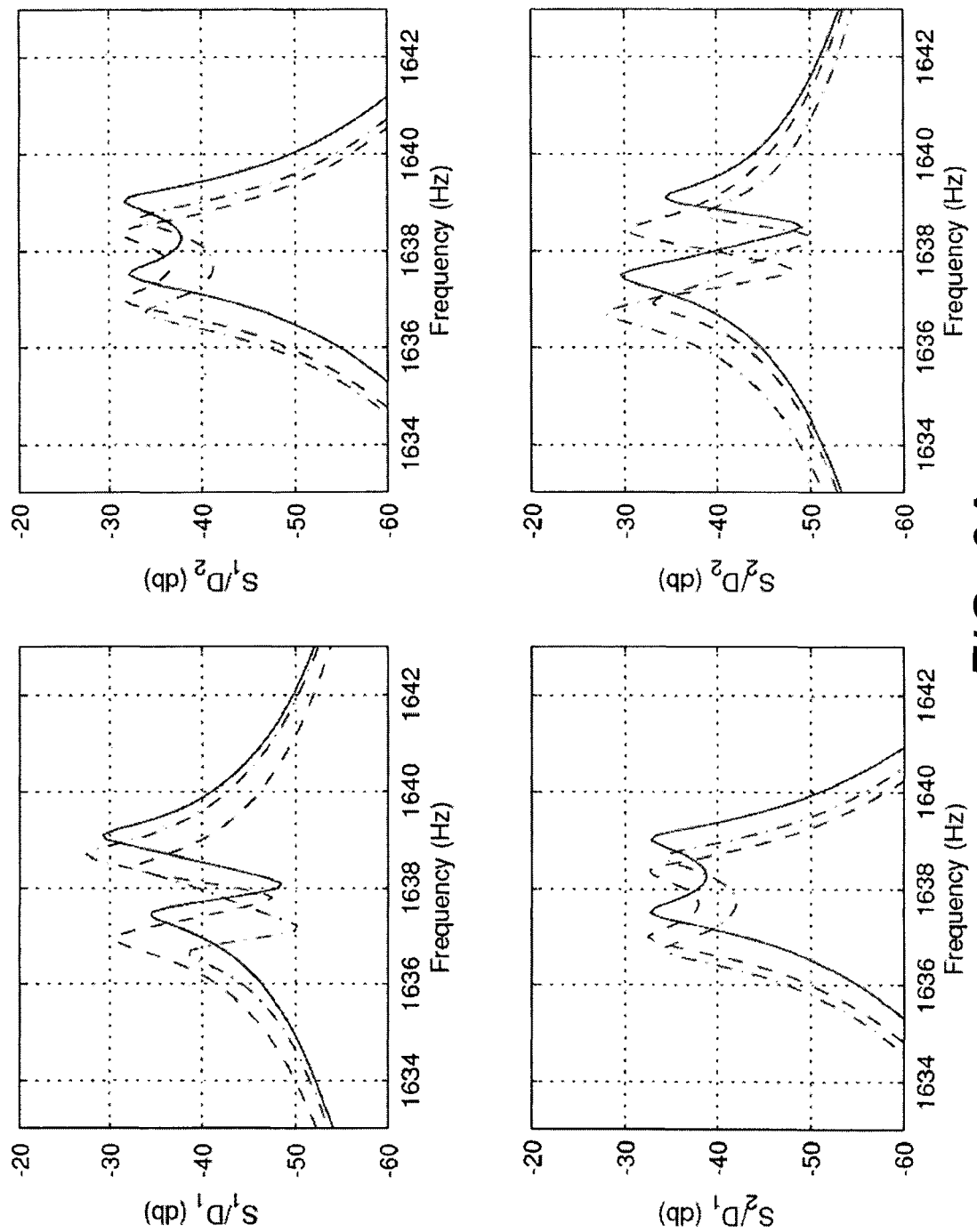
FIG. 6A shows the empirical frequency responses for perturbed cases along with the unperturbed case.

FIG. 5 shows the first $\Delta_1$ mass perturbation case places four magnets on the outer ring of the Macro DRG as shown in the left-hand image. The orientation of the image coincides with the image in FIG. 2. The second $\Delta_2$ mass perturbation case places four magnets on the outer ring of the DRG as shown in the right-hand image of FIG. 5. Masses are added at four points in each $\Delta$ to achieve more even mass loading. The empirical frequency responses for these perturbed cases along with the unperturbed case (no magnets added) are shown in a neighborhood of the fundamental Coriolis coupled modes in the plots of FIG. 6A. The solid trace represents the native resonator dynamics without any mass perturbation. The other two dashed traces represent the resonator dynamics when mass perturbations are created by attaching small magnets to the resonator at the locations shown in FIG. 5. Since the sensor is a two-input/two-output plant, four frequency response magnitude plots are shown in this figure (with individual channels denoted S1/D1, S2/D1, etc.). It is clear that mass perturbations shift both modal frequencies, change the frequency split, and also modify the coupling between the channels. The model parameter set $\{M_0, M_1, M_2, C, K\}$ is determined using equation (7) and the three sets of frequency response data corresponding the unperturbed sensor and the two perturbed cases are generated for comparison with the data. The model frequency response using mass matrix $M_k$, k=0, 1, 2, is given by $$\left(\sum_{l=0}^{n_e} R_l \omega^l\right)(-M_k \omega^2 + K + kC\omega)^{-1}.$$

Instead of plotting the model frequency response against the empirical frequency response, the absolute error between the data and model may be plotted by, $$\bar{\sigma}(\Psi_{k,q} - \tilde{R}_{k,q} Z_{act}^{-1}(j\omega_{k,q})), k=0,1,2,$$

Figure 6B:
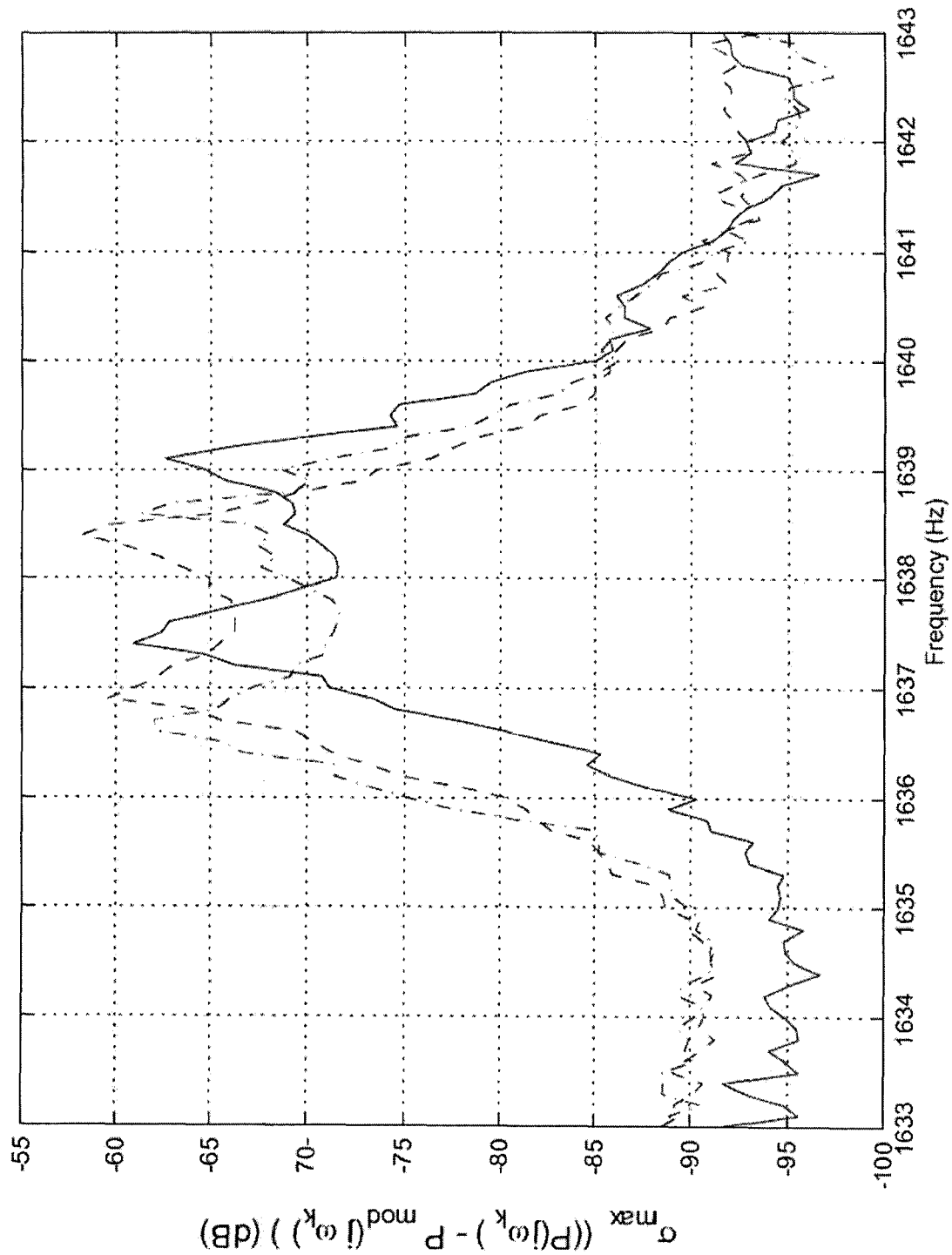
FIG. 6B shows the absolute error between the data and model giving a direct assessment of the modeling error as function of frequency.

These plots give direct assessment of the modeling error as function of frequency and are shown in the plot of FIG. 6B revealing absolute error between the empirical frequency response data and the identified model. The absolute error is approximately 25 dB smaller than the frequency response magnitude across the band of interest thereby demonstrating a good model fit. It may be convenient to define the mass matrix perturbation as $\Delta_k = M_k - M_0$, k=1, . . . , $n_{exp}$. This notation is adopted hereafter.

Because this model will be used to guide the mass addition/removal process with the objective of driving the two modal frequencies together, the predictive power of the model may be tested on two new data sets. The first test adds two magnets at each of the four points on the resonator corresponding to the positions shown the left-hand picture in FIG. 5 (a total of eight magnets). This perturbation doubles the magnitude of the mass perturbation corresponding to $\Delta_1$ so the empirical data can be compared with the frequency response of the model $$\left(\sum_{l=0}^{n_R} R_l \omega^l\right)(-(M_0 + 2\Delta_1)\omega^2 + K + jC\omega)^{-1}.$$

Figure 7A:
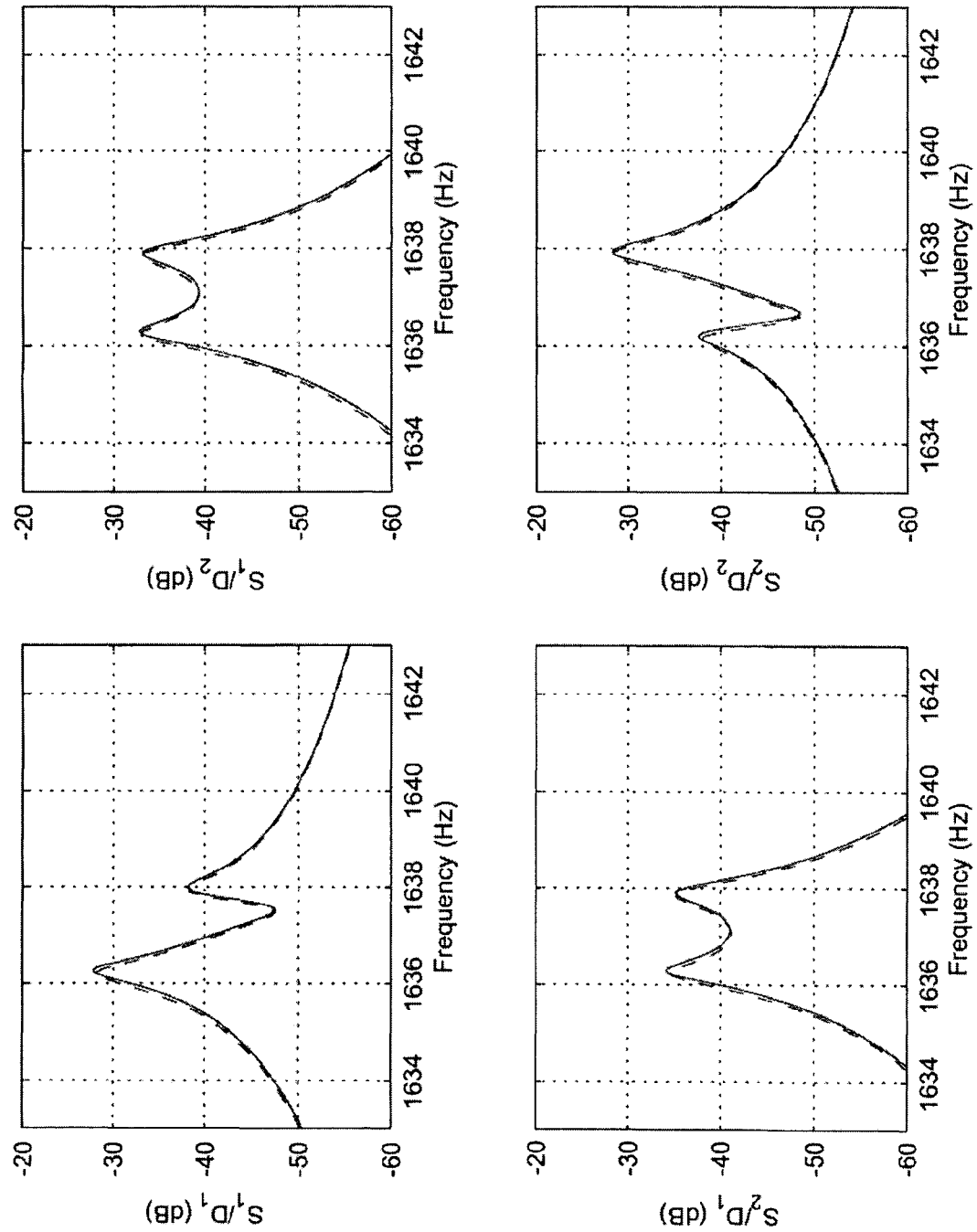
FIG. 7A empirical data versus frequency response of the model for double magnitude perturbation corresponding to $\Delta_1$.

This comparison ("Case 1") between the empirical frequency response of macro DRG with double the mass perturbation at the $\Delta_1$ perturbation locations (dashed trace) and the frequency response predicted by the model (thin solid trace) is made in the plots in FIG. 7A. The model predicts the actual frequency response extremely well especially since the positioning of the magnets is done by hand.

The second test case ("Case 2") involves placing a single magnet at each of the eight points on the resonator corresponding to the locations shown in both images of FIG. 5. This perturbation should correspond to modifying the nominal mass matrix by the sum of $\Delta_1$ and $\Delta_2$, thus the frequency response data may be compared against $$\left(\sum_{l=0}^{n_R} R_l \omega^l\right)(-(M_0 + \Delta_1 + \Delta_2)\omega^2 + K + jC\omega)^{-1}$$

Figure 7B:
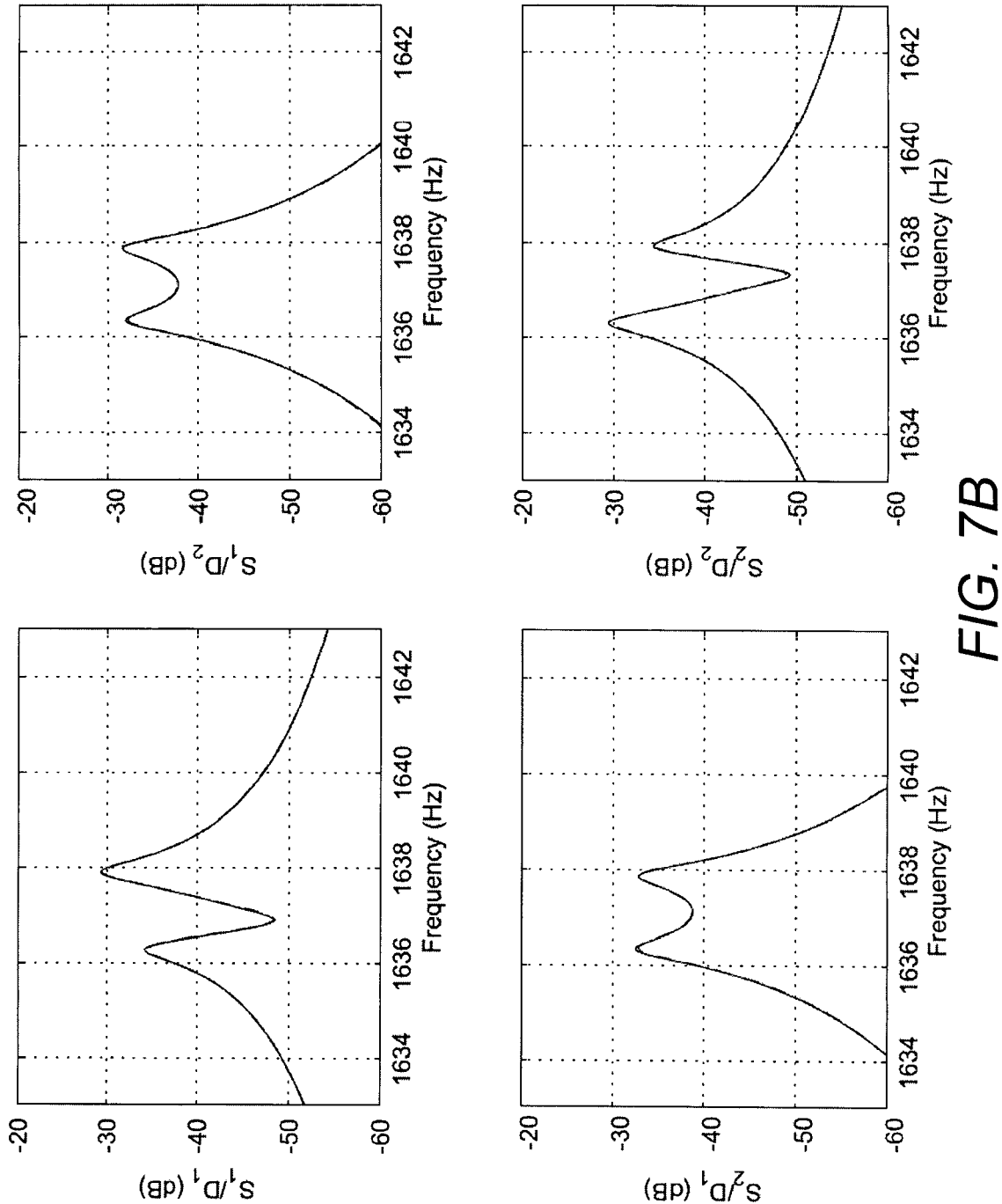
FIG. 7B empirical data versus frequency response of the model for double magnitude perturbation corresponding to $\Delta_1$.

The comparison ("Case 2") between the empirical frequency response of macro DRG with the mass perturbations in both the $\Delta_1$ and $\Delta_2$ perturbation locations (dashed trace) and the frequency response predicted by the model (thin solid mace) are shown in the plots of FIG. 7B. Here again, the plots shows very good agreement between the model prediction and the empirical frequency response data.

5. Tuning Modal Frequencies of a DRG

Figure 8:
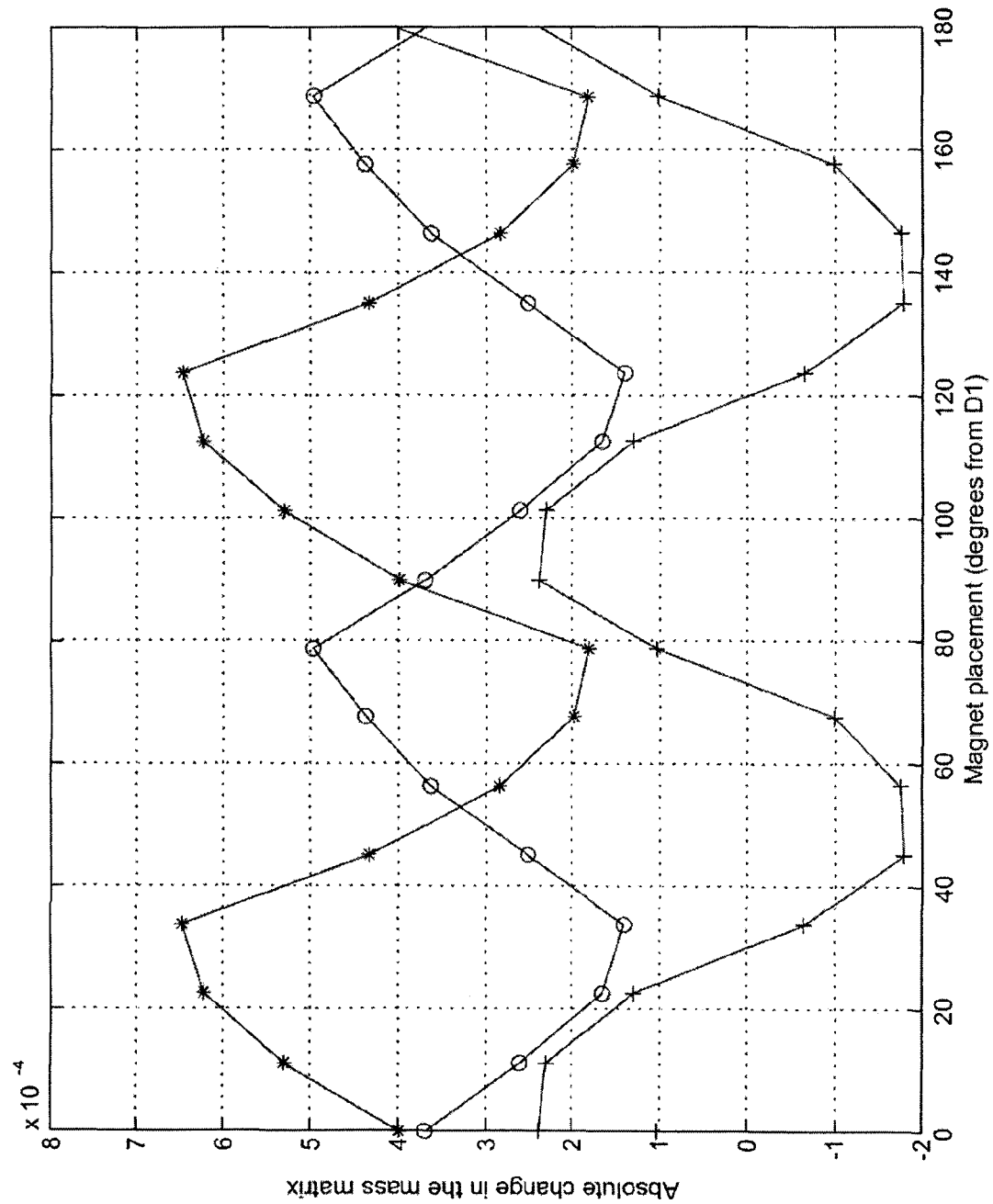
FIG. 8 shows plots of example mass matrix perturbation, $\Delta_k$, as a function of the counter-clockwise angle from the D1 axis, $\theta$, found by fitting the model to ten empirical frequency response data sets.

One challenge with tuning the modal frequencies using the mass perturbation approach that is not present in the prior art electrostatic tuning approach arises from the fact that the mass perturbation approach does not possess a simple representation of the mass perturbation matrix as a function of perturbation location on the resonator (whereas the tuning voltages appeared directly in the sensor model for the electrostatic case—the functional form of the stiffness matrix dependence on the tuning voltages is easily motivated by considering the energy stored in the capacitor formed by the resonator and tuning electrodes). It is possible to analytically derive a relationship between the perturbation location and the resulting mass matrix perturbation for a much simpler structure such as a single, thin ring. However, the complex topology of the DRG with its multiple, coupled, concentric rings precludes such a purely analytical approach. The mass perturbation matrix can, however, be experimentally identified using the sensor model of equation (6). Thus, the change in M in one ninety degree arc can be systematically observed at regular intervals. (It can be shown that adding the same mass at 90 degree, or 180 degree, angles relative to the current position produces the same mass matrix perturbation for the modes of interest.) For example, nine separate perturbations can be conducted with magnets spaced in 11.25 degree steps (a total of ten MIMO frequency response data sets) and then the modal parameter set $\{M_0, M_1, \ldots; M_9, C, K\}$ may be identified. A plot of the three components of each $\Delta_k \cdot k = 0, 1, \ldots, 9$, is shown in FIG. 8. The three traces represent the upper diagonal, lower diagonal and off diagonal terms of the positive definite $\Delta_k$ matrices.

FIG. 8 shows plots of example mass matrix perturbation, $\Delta_k$, as a function of the counter-clockwise angle from the D1 axis, $\theta$, found by fitting the model to ten empirical frequency response data sets. The upper diagonal term is denoted by '*', the lower diagonal by 'o', and the off diagonal term by '+'.

The identified model parameters may be used to test different possible perturbation scenarios. For this analysis, linear interpolation may be used to specify the perturbation matrix coefficients at angular values not represented in the experiments. This is clearly an approximation, but the guidance it provides in ultimately tuning the modes justifies its use. Thus, for the initial analysis the following perturbed mass matrix $M = M_0 + \alpha \Delta(\theta)$ may be used, where $\Delta(\theta)$ represents the mass matrix perturbation as a function of angular perturbation location $\theta$, (i.e. the coefficients represented graphically in FIG. 8), and $\alpha$ represents the scalar perturbation magnitude. (In the case with the magnets, the perturbation magnitude takes on discrete values since only a whole number of magnets can be added. On the other hand, there are other mass removal/deposition approaches that would provide much finer control over $\alpha$).

The objective is to find a perturbation magnitude and location that creates degenerate generalized eigenvalues of M and K. In addition to changes in the generalized eigenvalues of M and K as a function of $\alpha$ and $\theta$, changes in the generalized eigenvectors may also be observed, which indicate the angular position of the anti-nodes of the modes. By analyzing the generalized eigenvalues it can be concluded that in the case of a single perturbation location (replicated with the four-fold symmetry in the other quadrants vis-a-vis FIG. 5) there is a unique perturbation location and magnitude that tunes the modes. If the exact location is not correctly identified then it is not possible to tune the modes to degeneracy.

Figure 9:
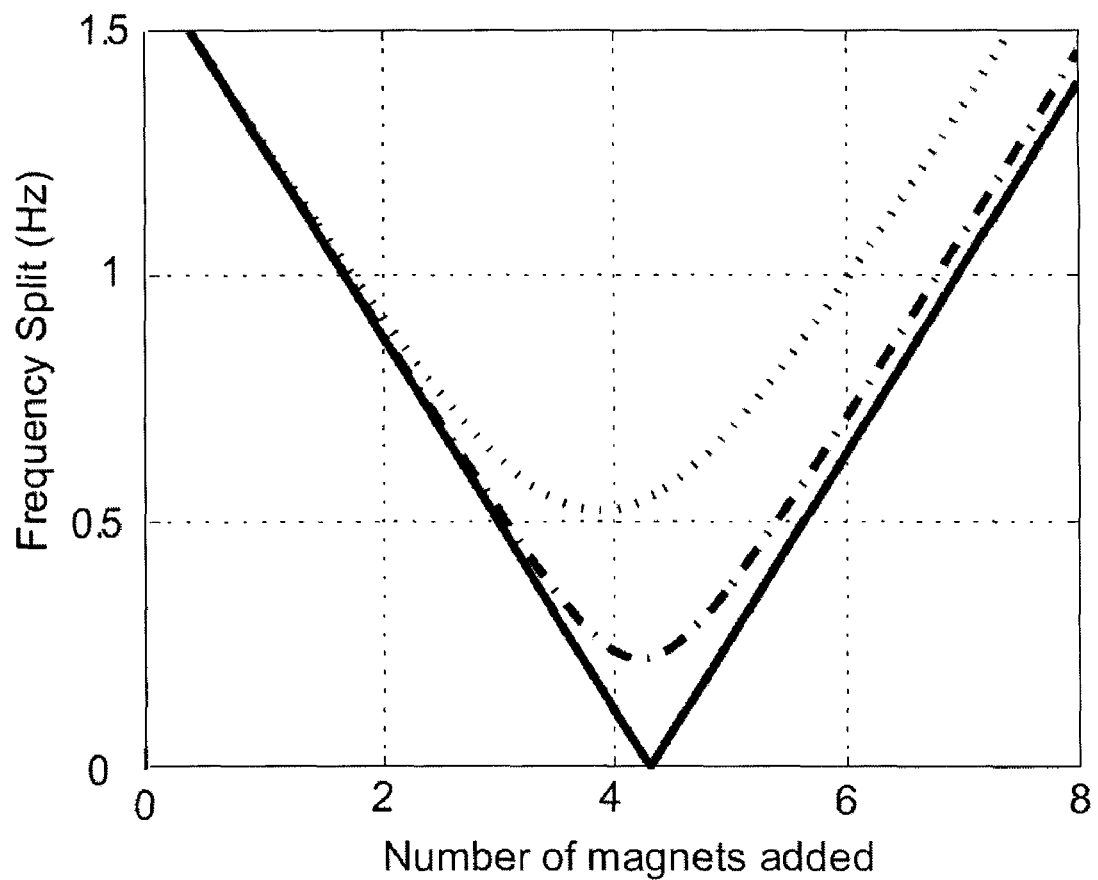
FIG. 9 shows plots of the frequency split (in Hz) predicted by the identified model as mass is added at seventy-five degrees (dotted line), eighty-two degrees (dash dotted line) and eighty degrees (solid line) measured counterclockwise from the $D_1$ actuator location.

FIG. 9 shows plots of the frequency split (in Hz) predicted by the identified model as mass is added at seventy-five degrees (dotted line), eighty-two degrees (dash dotted line) and eighty degrees (solid line) measured counterclockwise from the $D_1$ actuator location. The frequency split is initially reduced in all three cases as mass is added, however, only when mass is added to a single ideal location can the resonant frequencies be completely tuned. This figure shows that the magnitude of the perturbation must also be carefully controlled. The plot shows how the frequency split changes as function of perturbation location in a neighborhood of the location required for eigenvalue degeneracy. Thus, attempting to attain degeneracy by adding mass to only one angular location can be very difficult. It is possible, however, to attain convergence by adding mass to two different locations in a quadrant. By adding mass to either side of the anti-node of the higher frequency mode, the anti-nodal orientation is, in a sense, trapped. The anti-node is determined by the generalized eigenvector associated with the higher frequency mode. Since the goal is to tune a MEMS DRG, it will be easiest to add mass at the "spokes" (visible in FIG. 2 as the structures interconnecting adjacent rings and forming a radial pattern) of the resonator that are closest to the anti-node. In this scenario the perturbed mass matrix is given by $M = M_0 + \alpha_1 \Delta_1 + \alpha_2 \Delta_2$, where $\Delta_1$ and $\Delta_2$ correspond to the mass matrix perturbations associated with the desired spoke locations.

Figure 10:
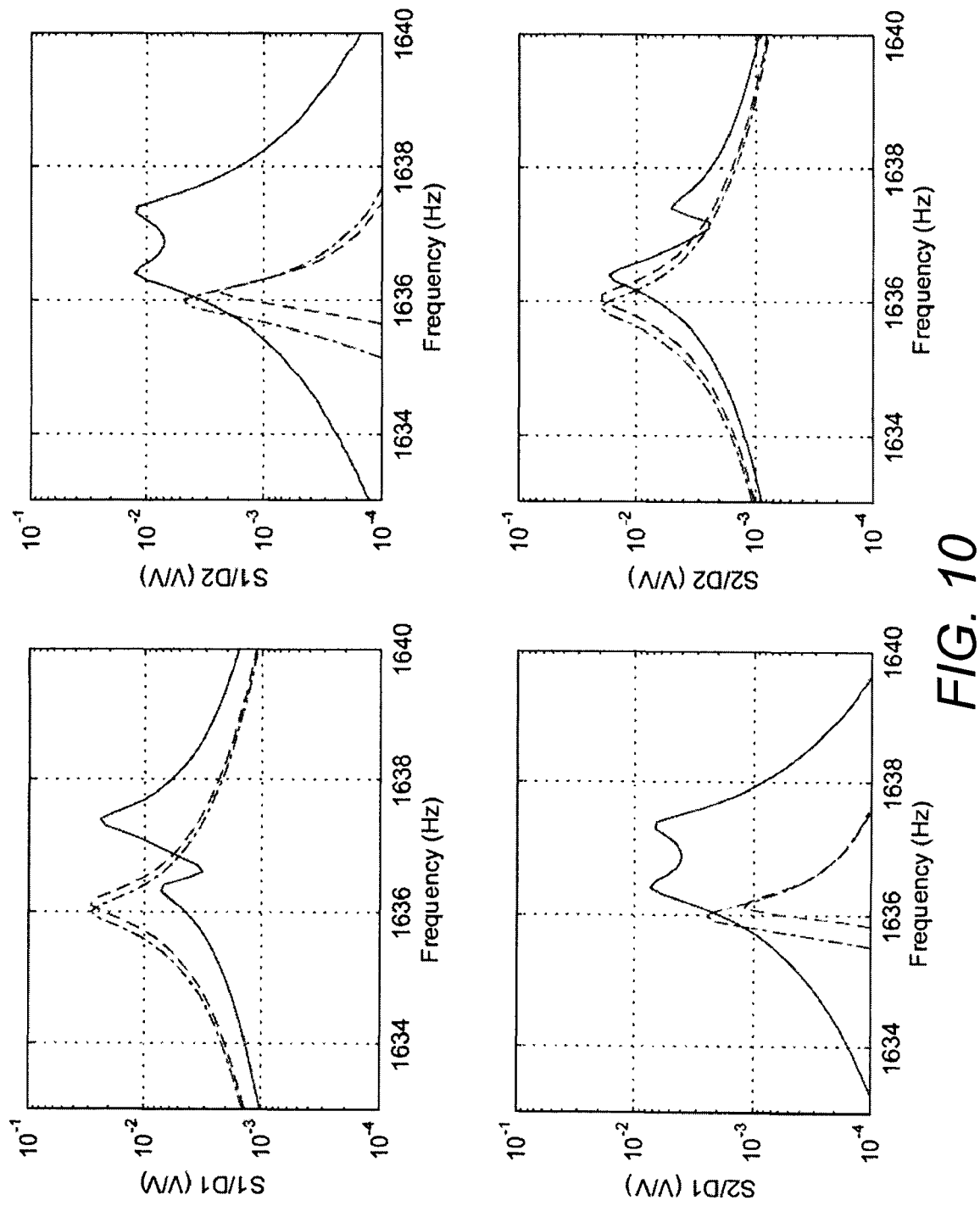
FIG. 10 shows the empirical frequency responses of an example tuned sensor using the mass matrix perturbations as function of $\alpha$ and $\theta$ as a guide.

FIG. 10 shows the empirical frequency responses of an example tuned sensor using the mass matrix perturbations as function of $\alpha$ and $\theta$ as a guide. The Macro DRG is tuned by single mass placement (dashed line) and the two spoke tuning approach (dash dotted line). The unperturbed frequency response is shown as the solid trace. Both approaches effectively tune the sensor modal frequencies to a frequency split of less than 100 mHz. As expected, the off-diagonal channels exhibit reduced coupling and the diagonal frequency responses resemble a single degree of freedom resonator. Also, using the spokes for modal frequency tuning inevitably produces a smaller tuned frequency because more total mass is added to the resonator.

Thus, methods using a mass matrix perturbation approach for tuning the two Coriolis-coupled modes in a vibratory gyroscope have been demonstrated on a scale model of an example DRG. Although mass was added to the resonator for the analysis, the methods are directly analogous to a process in which mass is removed as will be appreciated by those skilled in the art. Mass matrix perturbations may also be applied to reduce the coupling of linear acceleration to the Coriolis-coupled modes. This may be important for isolating the modes used for angular rate sensing from linear acceleration of the sensor case.

6. Tuning Modal Frequencies of a DRG by Exact Mass Placement

The dashed traces of FIG. 10 are the end result of an attempt to tune the Macro DRG by placing masses only along the axes of the antinodes of the high frequency mode. As described in FIG. 9 the results using this method are sensitive to errors in the placement of the mass. If mass is not added directly to an antinode, the positions of the antinodes change thereby increasing the distance of subsequent mass placements to the actual antinode and reducing the effectiveness of the tuning. Accordingly, an iterative method is used in which, at each step, the location of the antinodal axes are estimated using an empirical frequency response and a small amount of mass is added to these axes. At the conclusion of each iteration the antinodal axes move slightly. Thus, this method can be viewed as one in which the operator is "chasing" the modes. An example algorithm can be explicitly stated as follows:

1) Measure the 2×2 frequency response of the system.
2) Fit the data with a set $\{M, C, K, R\}$.
3) Using the generalized eigenvectors of M and K, estimate the location of the axes of the high frequency antinodes and the frequency split. If the split is less than 0.1 Hz (adequate given a Q of ~8K), the sensor is considered tuned and nothing further is done.
4) Add a small amount of mass along the estimated axes of the high frequency antinode.
5) Repeat as necessary from Step 1.

Figure 11:
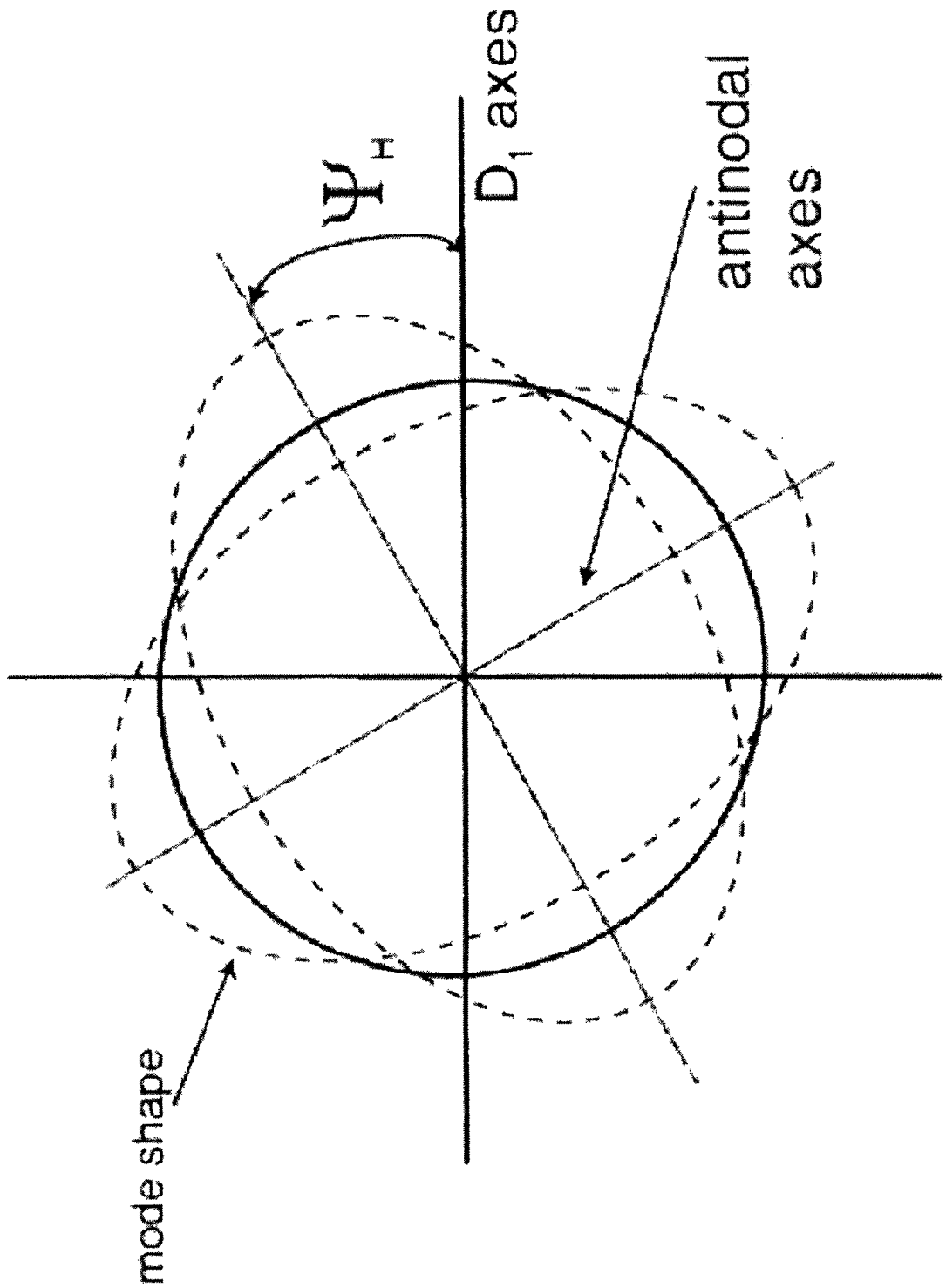
FIG. 11 illustrates how to find the location of the antinodes of a DRG.

FIG. 11 illustrates how to find the location of the antinodes of a DRG. A graphical representation of an arbitrary mode shape for a ring is shown. This mode shape closely approximates the shape of the outer rings of the Macro DRG and SiDRG. The angle $\psi_H$, that defines the high frequency mode shape can be approximated using the M and K found using the parameter fitting algorithm. The generalized eigenvectors and eigenvalues of M and K are the solutions v and $\lambda$, to $Mv\lambda=Kv$. An approximation of the two resonant frequencies, $\omega_i$, can be found by the relation $\omega_i^2=\lambda_i$, i=1,2. An estimate for the physical angular location or the axes or the high frequency antinode, $\psi_H$, can be found by $\tan 2\psi_H=v_2/v_1$ where $v_1$ and $v_2$ are the components of the eigenvector associated with the high frequency mode, $v_H$.

Figure 12:
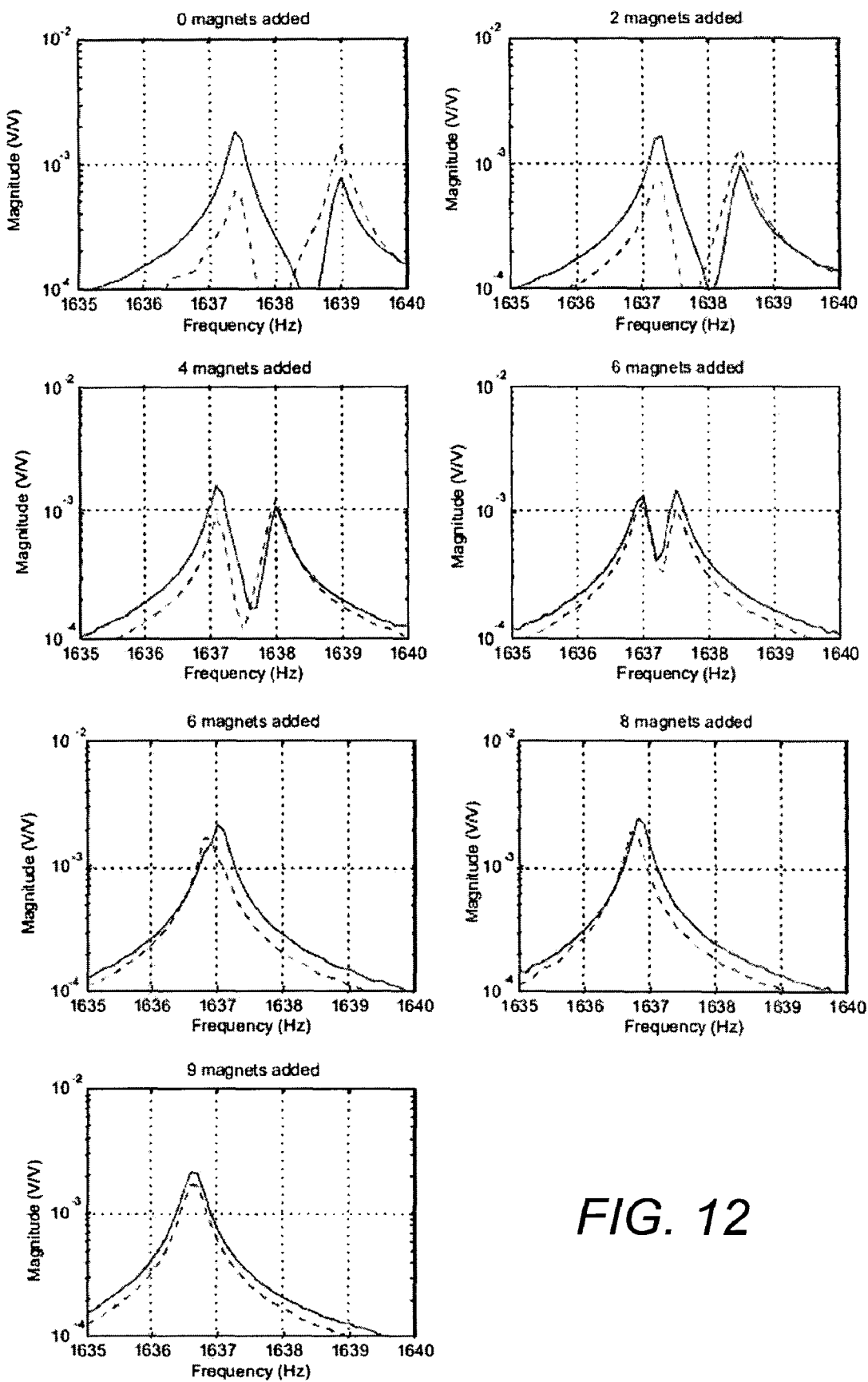
FIG. 12 shows plots of the two diagonal channels overlayed when the first example tuning algorithm is employed corresponding to the data in Table 1.
Figure 13:
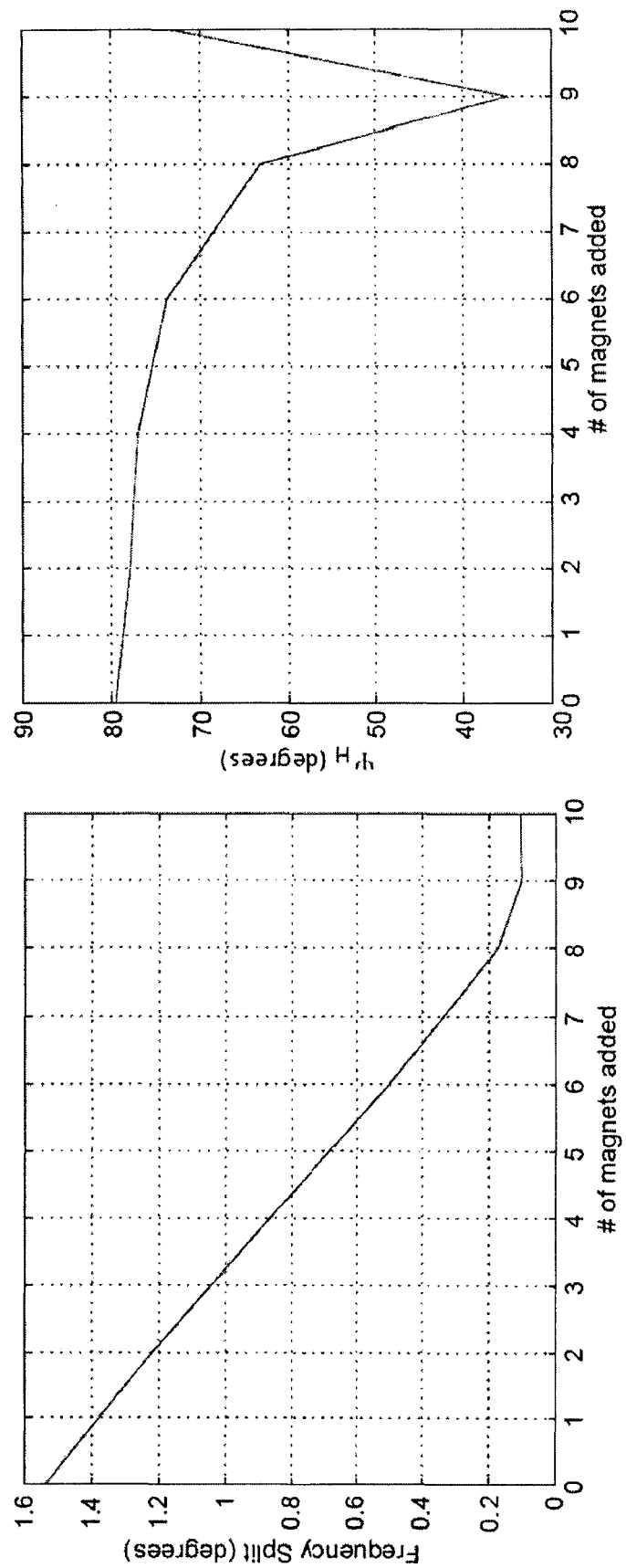
FIG. 13 shows the frequency split between the high and low frequency modes as masses are added in FIG. 12 and $\psi_H$ using the fits of the data in FIG. 12.

A sample result of this algorithm are presented in Table 1 and FIGS. 12 and 13. The plots of FIG. 12 each show the two diagonal channels overlayed when the above algorithm is employed. The final frequency split in this case is significantly reduced. An even smaller split could be achieved if smaller magnets were allowed to be used. FIG. 13 shows the frequency split between the high and low frequency modes as masses are added in FIG. 12 in the left plot. The split steadily decreases in a linear fashion. The right plot of FIG. 13 shows $\psi_H$ using the fits of the data in FIG. 12. The axes appear to turn clockwise as mass is added, meaning that the masses are consistently being placed slightly counterclockwise from the axes. This is probably caused by the fact that the mode shape for this structure is more complex than a single harmonic (as in a ring) giving the approximation of $\psi_H$ some bias. The resulting frequency split of 0.1 Hz is adequate given that a discrete number of magnets must be added at each radial location. Since each magnet changes the split by about 0.19 Hz, it is difficult to achieve a split below 0.1 Hz. A SiDRG can be tuned using this algorithm if the algorithm is adapted so that mass is taken away from the axes of the low frequency antinode using, for example, a laser.

TABLE 1

Sample Execution of Iteration Method

| ID# | # of magnets | Location of added magnets (degrees) | $\psi$ (degrees) | Frequency split (Hz) |
|---|---|---|---|---|
| 1 | 0 | NA | 77.9 | 1.54 |
| 2 | 2 | 78 | 76.5 | 1.22 |
| 3 | 4 | 77 | 75.6 | 0.80 |
| 4 | 6 | 75 | 72.7 | 0.50 |
| 5 | 8 | 73 | 63.8 | 0.17 |
| 6 | 9 | 64 | 33.5 | 0.10 |
| 7 | 10 | 33 | 72 | 0.10 |

7. Tuning Modal Frequencies of a DRG by Adding Masses at Spokes

As an alternative, a DRG may also be tuned by perturbing mass only at the "spokes." It is more convenient to use the spokes of the device because they are the easiest location for an operator to place a magnet on the Macro DRG and will be the easiest location to target on an actual SiDRG with a laser or mass deposition system. Though an iterative process can be used, one can also take advantage of the linearity of the $\Delta(\theta)$ function described previously. In this process, perturbations are done to each spoke separately and three separate 2×2 frequency responses are found. These can then be fitted with a parameter set $\{M_0, \Delta_1, \Delta_2, C, K, R\}$. Finally, weightings $\alpha_1$ and $\alpha_2$ can be found so that the resulting system with mass matrix, $M_0+\alpha_1\Delta_1+\alpha_2\Delta_2$, and stiffness, K, is degenerate (i.e. the generalized eigenvalues of the new M and K are equal). Thus, these $\alpha$'s are found using the following optimization.

$$\text{Min:} \quad \lambda_{high} - \lambda_{low} \quad (8)$$

$$\text{Subject to:} \quad \begin{array}{l} \alpha_i > 0, i = 1, 2 \\ M = M_0 + \alpha_1\Delta_1 + \alpha_2\Delta_2 \\ \lambda_{low}M < K, \lambda_{high}M > K \\ \lambda_{high} > 0, \lambda_{low} > 0 \end{array}$$

The algorithm can be explicitly stated as follows:
1) Measure the 2×2 frequency response of the system.
2) Fit the data with a set $\{M, C, K, R\}$.
3) Using the generalized eigenvector of M and K, estimate the location of the axes of the high frequency antinodes. Identify the two spokes closest to these axes.
4) Add a small amount of mass to the first identified spoke. Measure the subsequent 2×2 frequency response.
5) Add a small amount of mass to the second identified spoke. Measure a final 2×2 frequency response.
6) Apply the parameter finding algorithm (with the data from steps 1, 4 and 5) to find $\{M, \Delta_1, \Delta_2, C, K, R\}$.
7) Use equation (8) to find $\alpha_1$ and $\alpha_2$. Add a total of $\alpha_1$ mass perturbations to the first identified spoke and $\alpha_2$ mass perturbations on the second identified spoke (for the Macro DRG example, one magnet acts as the fundamental perturbation, so $\alpha_1$ and $\alpha_2$ must be rounded to the nearest integers).
8) Perform a final 2×2 frequency response. If the split is still greater than 0.1 Hz, add a small amount of mass to the spoke that is now closest to the axes of the high frequency mode and repeat this step.

Figure 14:
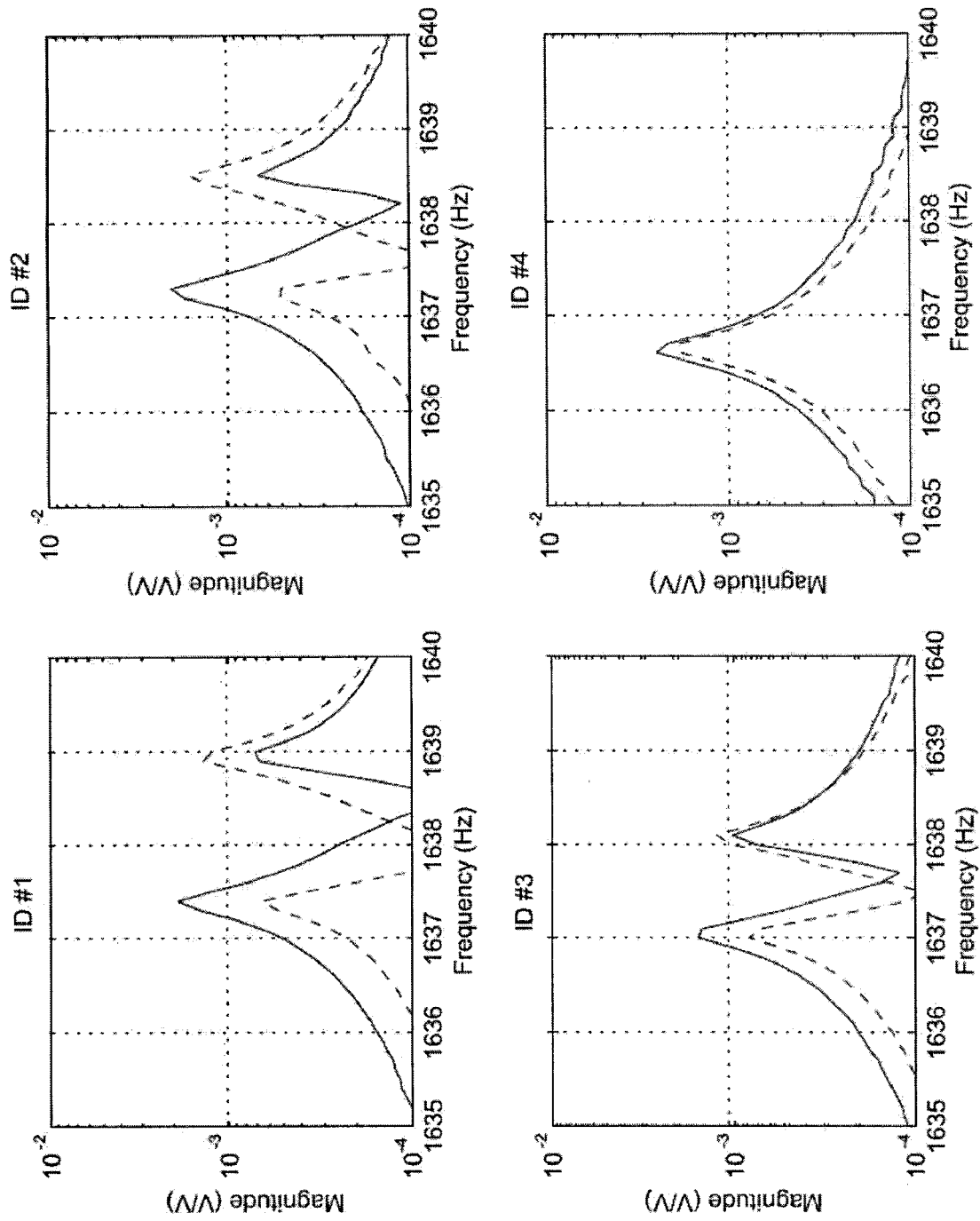
FIG. 14 shows plots of the two diagonal channels overlayed when magnets are added to the spokes corresponding to the data in Table 2.
Figure 15:
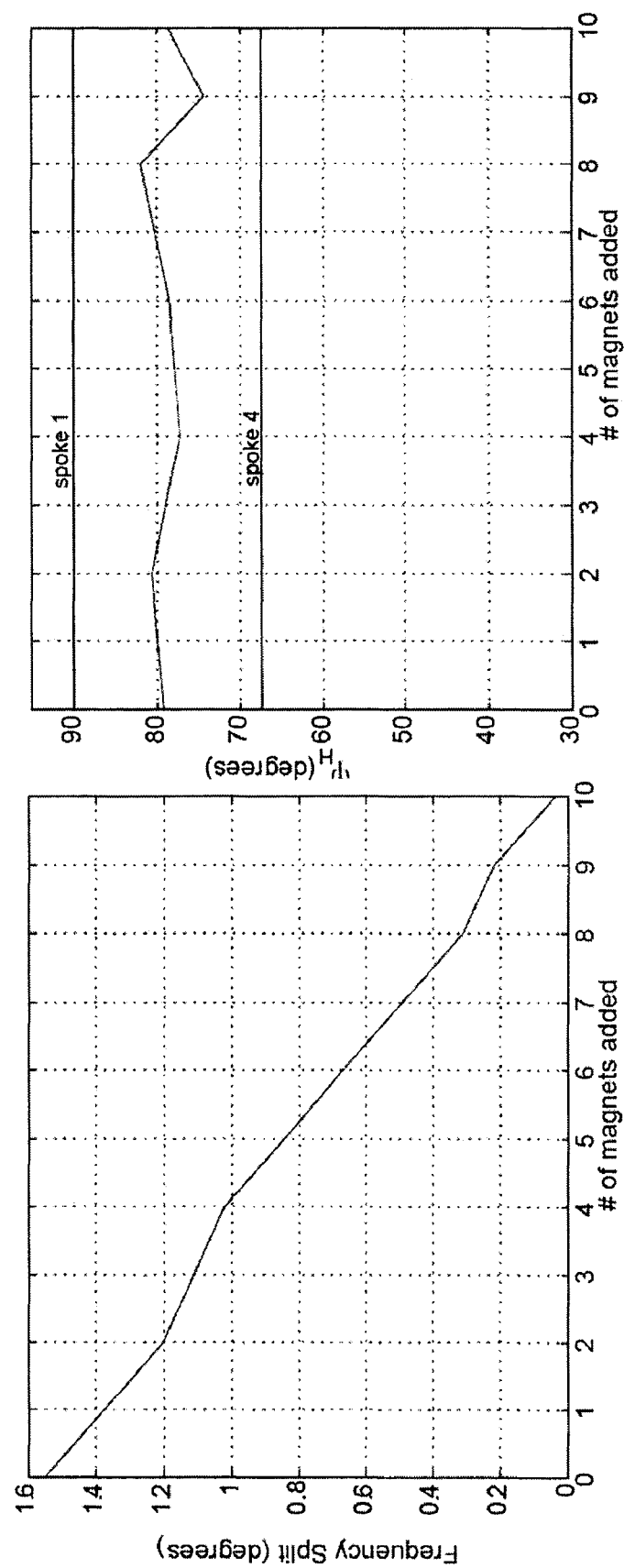
FIG. 15 shows the frequency split in the left plot and $\psi_H$ in the right plot using the spokes algorithm as applied in FIG. 14.

Assuming the fits are good, the last iterative step is not needed and only exists as a backup. A sample result of the algorithm is expressed in Table 2 and FIGS. 14 and 15. After ID's 1, 2, and 3 the weightings predicted by equation (8) are $\alpha_1$=6.8 and $\alpha_2$=3.2, which can be rounded to 7 and 3 respectively. FIG. 14 shows plots of the two diagonal channels overlayed when magnets are added to the spokes corresponding to the data in Table 2. After the first three ID's, optimization code gives the weighting needed to tune the device. These weightings are used on the forth step and the Macro DRG is successfully tuned. FIG. 15 shows the frequency split in the left plot and $\psi_H$ in the right plot using the spokes algorithm. In this case, ID's are taken as each individual mass is added. Using this algorithm, the frequency split gradually declines as the axes of the antinodes of the high frequency mode are "trapped" within the spokes used for tuning. (The horizontal black lines represent the fourth and first spoke, respectively.)

TABLE 2

Sample Execution of Spokes Method.

| ID# | # of magnets on Spoke 1 | # of magnets on Spoke 4 | $\psi$ (degrees) | Frequency split (Hz) |
|---|---|---|---|---|
| 1 | 0 | 0 | 77.8 | 1.55 |
| 2 | 0 | 2 | 79.1 | 1.20 |
| 3 | 2 | 2 | 75.8 | 1.02 |
| 4 | 3 | 7 | 78.3 | 0.04 |

Here also, the sensor is tuned to have a far smaller split than it started with. Finally this would be a more desirable approach to the tuning of an actual SiDRG given that the spokes present a much more feasible target than an arbitrary position on an individual ring.

Figure 16:
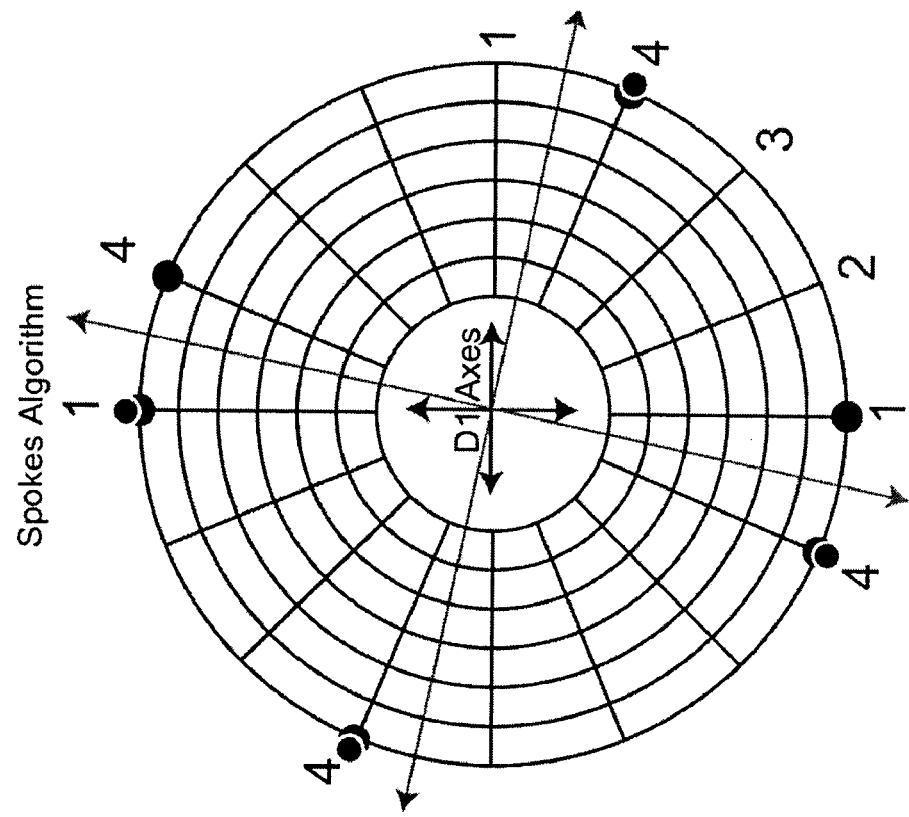
FIG. 16 shows an illustration of the sensor tuned using the example algorithms.
Figure 16:
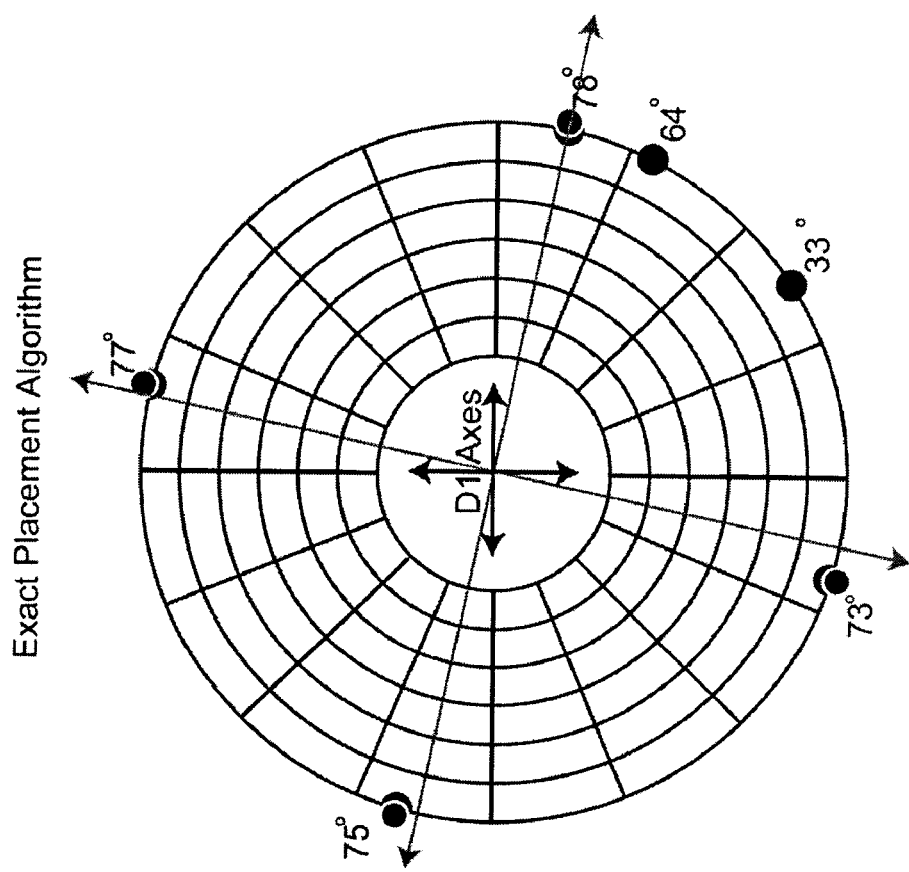

FIG. 16 shows an illustration of the sensor tuned using the first algorithm (Table 1) in the left image. Each black circle represents one magnet. Magnets are placed on the estimated location of the high frequency antinode. The gray axes denote the original estimate of the axes of the antinodes of the high frequency mode. Note that magnet placement is only dependent on its counter clockwise angle from axes of the $D_1$ coordinate system. Thus, magnets can be added in a more balanced manner as shown. The right image of FIG. 16 illustrates the sensor tuned using the spokes algorithm (Table 2). Again the gray axes denote the original estimate of the axes of the antinodes or the high frequency mode. In this case, more magnets are necessary, but the process is easier to perform and achieved a smaller final frequency split.

7. Method of Tuning a Disc Resonator Gyroscope

Figure 17:
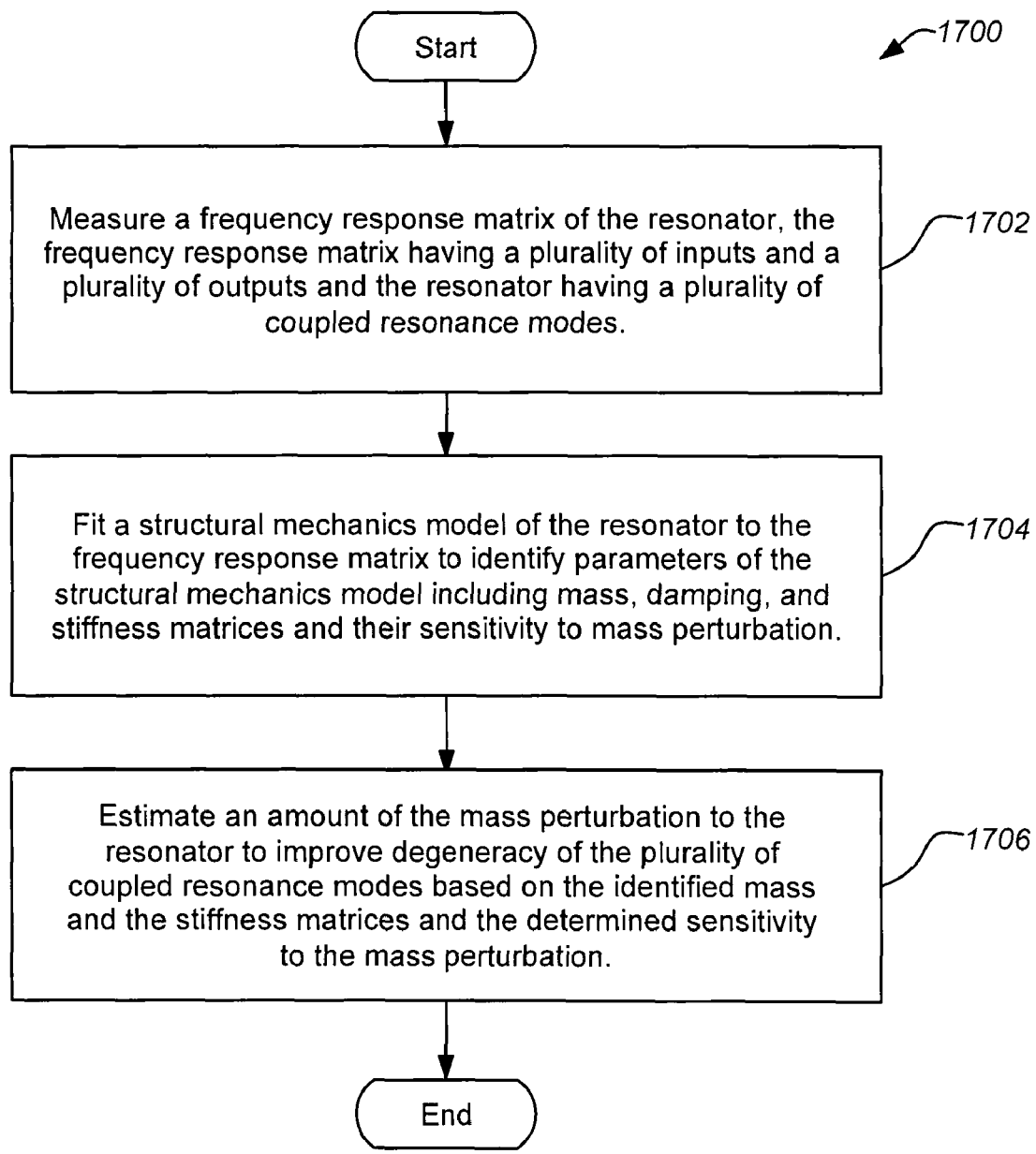
FIG. 17 is a flowchart of an exemplary method for tuning a resonator by mass perturbation based on an identified model

FIG. 17 is a flowchart of an exemplary method 1700 for tuning a resonator by mass perturbation based on an identified model. The method 1700 begins with an operation 1702 of measuring a frequency response matrix of the resonator. The frequency response matrix includes a plurality of inputs and a plurality of outputs and the resonator has a plurality of coupled resonance modes. Next in operation 1704, a structural mechanics model of the resonator is fitted to the frequency response matrix to identify parameters of the structural mechanics model including mass, damping, and stiffness matrices and their sensitivity to mass perturbation. Finally in operation 1706, an amount of the mass perturbation to the resonator is estimated to improve degeneracy of the plurality of coupled resonance modes based on the identified mass and the stiffness matrices and the determined sensitivity to the mass perturbation. The method 1700 may be further modified consistent with the embodiments described herein.

For example, a typical tuning process might be employed on a disc resonator comprising a plurality of concentric interconnected rings and having a plurality of coupled Coriolis resonance modes having axes of antinodes. Mass perturbation of the disc resonator may comprise removing mass by a laser ablation process and/or adding mass by a mass deposition process, e.g. such as any known semiconductor mass deposition process or an inkjet type deposition process.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A method of tuning a resonator, comprising:
   measuring a frequency response matrix of the resonator, the frequency response matrix having a plurality of inputs and a plurality of outputs and the resonator having a plurality of coupled resonance modes;
   fitting a structural mechanics model of the resonator to the frequency response matrix to identify parameters of the structural mechanics model including mass, damping, and stiffness matrices and mass, damping, and stiffness sensitivity to mass perturbation; and
   estimating an amount of the mass perturbation to the resonator to improve degeneracy of the plurality of coupled resonance modes based on the identified mass and the stiffness matrices and the mass, damping, and stiffness sensitivity to mass perturbation to the mass perturbation;
   wherein the parameters of the structural mechanics model further include an R matrix reflecting signal conditioning and non-coloration in operating the resonator.

2. The method of claim 1, wherein the mass perturbation comprises removing mass by a laser ablation process.

3. The method of claim 1, wherein the mass perturbation comprises adding mass by a mass deposition process.

4. The method of claim 1, wherein estimating the mass perturbation to the resonator comprises estimating a location of axes of antinodes and frequency split of the coupled resonance modes based on the parameters of the mass and the stiffness matrices.

5. The method of claim 4, further comprising creating the amount of the mass perturbation on the resonator along one of the axes of the antinodes of the coupled resonance modes after determining that adequate degeneracy of the frequency split of the coupled resonance modes has not been reached.

6. The method of claim 5, wherein the antinodes of the coupled resonance modes comprise high frequency antinodes and low frequency antinodes and creating the estimated amount of the mass perturbation comprises adding mass on the resonator along the axes of the high frequency antinodes of the coupled resonance modes.

7. The method of claim 5, wherein the antinodes of the coupled resonance modes comprise high frequency antinodes and low frequency antinodes and creating the estimated amount of the mass perturbation comprises removing mass on the resonator along the axes of the low frequency antinodes of the coupled resonance modes.

8. The method of claim 1, wherein the resonator is a disc resonator comprising a plurality of concentric interconnected rings.

9. The method of claim 8, wherein the plurality of coupled resonance modes are Coriolis coupled modes of the disc resonator.

10. The method of claim 9, wherein interconnections between the rings are aligned to form spokes and the estimated amount of the mass perturbation is estimated on two of the spokes closest one of axes of antinodes of the coupled resonance modes of the disc resonator.

11. The method of claim 10, further comprising creating the estimated amount of the mass perturbation on a first and then a second of the two spokes closest the one of the axes of the antinodes of the coupled resonance modes of the disc resonator and re-measuring the frequency response matrix of the resonator after creating the estimated amount of the mass perturbation to each of the first and the second of the two spokes.

12. The method of claim 11, wherein the antinodes of the coupled resonance modes comprise high frequency antinodes and low frequency antinodes and creating the amount of the mass perturbation comprises adding mass to the first and then the second of the two spokes closest the axes of the high frequency antinodes of the disc resonator.

13. The method of claim 11, wherein the antinodes of the coupled resonance modes comprise high frequency antinodes and low frequency antinodes and creating the amount of the mass perturbation comprises removing mass to the first and then the second of the two spokes closest the axes of the low frequency antinodes of the disc resonator.

14. The method of claim 11, further comprising using data of the measured and re-measured frequency response matrix to fit the structural mechanics model of the resonator to redetermine the parameters of the structural mechanics model including the mass, the damping, and the stiffness matrices, and further including a mass change at each of the two spokes.

15. The method of claim 14, wherein estimating the amount of the mass perturbation to the disc resonator to improve degeneracy of the plurality of coupled resonance modes comprises solving for the mass change at each of the two spokes to improve degeneracy based on the redetermined parameters of the structural mechanics model.

16. A method of tuning a disc resonator, comprising:
measuring a frequency response matrix of the disc resonator, the frequency response matrix having a plurality of inputs and a plurality of outputs and the disc resonator having a plurality of coupled Coriolis resonance modes having axes of antinodes;
fitting a structural mechanics model of the disc resonator to the frequency response matrix to identify parameters of the structural mechanics model including mass, damping, and stiffness matrices and their sensitivity to mass perturbation; and
estimating an amount of the mass perturbation to the disc resonator at the axes of the antinodes to improve degeneracy of the plurality of coupled Coriolis resonance modes based on the parameters of the mass and the stiffness matrices;
wherein the disc resonator comprises a plurality of concentric interconnected rings and the parameters of the structural mechanics model further include an R matrix reflecting signal conditioning and non-colocation in operating the resonator.

17. The method of claim 16, wherein the mass perturbation comprises removing mass by a laser ablation process.

18. The method of claim 16, wherein the mass perturbation comprises adding mass by a mass deposition process.

19. The method of claim 16, further comprising creating the mass perturbation on the disc resonator along one of the axes of the antinodes of the coupled Coriolis resonance modes after determining that adequate degeneracy of a frequency split of the coupled Coriolis resonance modes has not been reached.

20. The method of claim 19, wherein the antinodes of the coupled Coriolis resonance modes comprise high frequency antinodes and low frequency antinodes and creating the mass perturbation comprises adding mass on the disc resonator along the axes of the high frequency antinodes of the coupled Coriolis resonance modes.

21. The method of claim 19, wherein the antinodes of the coupled Coriolis resonance modes comprise high frequency antinodes and low frequency antinodes and creating the mass perturbation comprises removing mass on the disc resonator along the axes of the low frequency antinodes of the coupled Coriolis resonance modes.

22. The method of claim 16, wherein interconnections between the rings are aligned to form spokes and estimating the mass perturbation comprises identifying two of the spokes closest one of axes of antinodes of the coupled Coriolis resonance modes of the disc resonator.

23. The method of claim 22, further comprising creating the amount of the mass perturbation on a first and then a second of the two spokes closest the one of the axes of the antinodes of the coupled Coriolis resonance modes of the disc resonator.

* * * * *